United States Patent
Yokomizo et al.

(10) Patent No.: US 10,889,076 B2
(45) Date of Patent: Jan. 12, 2021

(54) METHOD FOR PRODUCING FIBER-REINFORCED RESIN SHAPED PRODUCT

(71) Applicant: Teijin Limited, Osaka (JP)

(72) Inventors: Hodaka Yokomizo, Osaka (JP); Shuhei Suzuki, Osaka (JP); Masahiro Kitagawa, Osaka (JP); Hidenori Aoki, Osaka (JP)

(73) Assignee: Teijin Limited, Osaka (JP)

( * ) Notice: Subject to any disclaimer, the term of this patent is extended or adjusted under 35 U.S.C. 154(b) by 286 days.

(21) Appl. No.: 16/068,538

(22) PCT Filed: Jan. 6, 2017

(86) PCT No.: PCT/JP2017/000198
§ 371 (c)(1),
(2) Date: Jul. 6, 2018

(87) PCT Pub. No.: WO2017/119465
PCT Pub. Date: Jul. 13, 2017

(65) Prior Publication Data
US 2019/0016067 A1     Jan. 17, 2019

(30) Foreign Application Priority Data
Jan. 8, 2016    (JP) .................................. 2016-003024

(51) Int. Cl.
*B29C 70/46*    (2006.01)
*B29C 43/36*    (2006.01)
(Continued)

(52) U.S. Cl.
CPC ............ *B29C 70/46* (2013.01); *B29C 43/021* (2013.01); *B29C 43/36* (2013.01); *B29C 70/541* (2013.01);
(Continued)

(58) Field of Classification Search
None
See application file for complete search history.

(56) References Cited

U.S. PATENT DOCUMENTS

| 5,614,285 A | 3/1997 | Gardill |
| 2001/0045684 A1 | 11/2001 | Blanchon |

(Continued)

FOREIGN PATENT DOCUMENTS

| CA | 2179820 A1 | 6/1996 |
| DE | 102012217373 A1 | 5/2014 |
| DE | 102013222357 A1 | 5/2015 |
| JP | H06-335934 A | 12/1994 |
| JP | 2009-196145 A | 9/2009 |
| JP | 2011-075121 A | 4/2011 |

(Continued)

OTHER PUBLICATIONS

Nov. 22, 2018—(EP) Search Report—App 17736002.1.
Dec. 4, 2018—(EP) Office Action—App 17736002.1.
Feb. 14, 2017—International Search Report—App PCT/JP2017/000198.

*Primary Examiner* — Nathan T Leong
(74) *Attorney, Agent, or Firm* — Banner & Witcoff, Ltd.

(57) ABSTRACT

A method for producing a fiber-reinforced resin shaped product, by clamping and press-molding a molding material containing reinforcing fibers and a thermoplastic resin as a matrix in molds having an upper mold and a lower mold. The method includes: disposing the molding material heated in a plastic state, between the upper mold and the lower mold; initiating the clamping to apply a force in a substantially clamping direction to a certain site of the molding material; starting deformation of the molding material in the substantially clamping direction; applying a force in the substantially clamping direction to a fixing site which is at least a part of a substantially outer peripheral end portion of the molding material but is different from the certain site; pressing and fixing the fixing site, and completing the clamping to obtain a fiber-reinforced resin shaped product having an edge portion.

8 Claims, 4 Drawing Sheets

(51) Int. Cl.
- *B29C 70/54* (2006.01)
- *B29C 43/02* (2006.01)
- *B29K 101/12* (2006.01)
- *B29L 31/30* (2006.01)
- *B29K 105/06* (2006.01)
- *B29K 307/04* (2006.01)

(52) U.S. Cl.
CPC .......... *B29C 70/543* (2013.01); *B29C 70/545* (2013.01); *B29C 2043/022* (2013.01); *B29C 2043/3602* (2013.01); *B29K 2101/12* (2013.01); *B29K 2105/06* (2013.01); *B29K 2307/04* (2013.01); *B29L 2031/30* (2013.01)

(56) References Cited

U.S. PATENT DOCUMENTS

| | | |
|---|---|---|
| 2011/0193258 A1 | 8/2011 | Tanaka et al. |
| 2016/0158975 A1 | 6/2016 | Suzuki et al. |

FOREIGN PATENT DOCUMENTS

| | | | |
|---|---|---|---|
| JP | 2011-218798 A | | 11/2011 |
| JP | 2013-067051 A | | 4/2013 |
| JP | 2013-173334 A | | 9/2013 |
| JP | 2013173334 | * | 9/2013 |
| JP | 2014-094489 A | | 5/2014 |
| JP | 2014094489 | * | 5/2014 |
| WO | 2015/064207 A1 | | 5/2015 |
| WO | 2015/194533 A1 | | 12/2015 |
| WO | WO2015194533 | * | 12/2015 |

\* cited by examiner

METHOD FOR PRODUCING FIBER-REINFORCED RESIN SHAPED PRODUCT

CROSS REFERENCE TO RELATED APPLICATIONS

This is a U.S. National Phase Application under 35 U.S.C. § 371 of International Application No. PCT/JP2017/000198, filed Jan. 6, 2017, which claims priority to Japanese Application No. 2016-003024 filed on Jan. 8, 2016, the entire contents of each of which are incorporated herein by reference.

TECHNICAL FIELD

The present invention relates to a method for producing a fiber-reinforced resin shaped product having an edge portion, from a molding material containing carbon fibers and a thermoplastic resin as a matrix.

BACKGROUND ART

In recent years, in the mechanical field, so-called fiber-reinforced resin materials containing a matrix resin and reinforcing fibers such as carbon fibers have attracted attention. These fiber-reinforced resin materials are excellent in tensile modulus, tensile strength, impact resistance, and the like, and thus have been studied for use in structural members of automobiles and the like. Among these, fiber-reinforced thermoplastic resin materials in which the matrix resin is a thermoplastic resin are excellent in mass productivity such as in molding as compared with fiber-reinforced resin materials with a thermosetting resin, and therefore, have been studied for practical application in many fields. The fiber-reinforced thermoplastic resin materials can be molded by various methods such as injection molding and compression molding, and it is easy to produce a shaped product according to required properties by appropriately selecting a molding material and a method. Thus, the fiber-reinforced thermoplastic resin shaped product can be used for a wide range of applications from large parts to small parts.

In a case of producing large parts using a fiber-reinforced thermoplastic resin material as a molding material, press molding or like can be suitably used. In the press molding, there are known methods such as a closed cavity method, in which a cavity space becomes a sealed space before molds having upper and lower parts (hereinafter also referred to as mold for molding or simply mold) is closed, and an internal pressure of the cavity increases with mold clamping so that a molding material in a plastic state, which is disposed in the cavity, flows and a molding surface is transferred thereto, and an open cavity method, in which the cavity space is in a released state even with clamping of the molds and a cavity surface pressure is applied.

In the closed cavity method, in a case of using a molding material having fluidity in a plastic state, it is possible to flow-fill the entire cavity; an excellent development of a product thickness is exhibited even in an uneven thickness portion or a deeply-drawn portion; and also an internal pressure of the cavity increases. Thus, a surface transfer property of the molds is improved. On the other hand, in the open cavity method, in a case of using a molding material having fluidity in a plastic state, a force of press molding is considerably consumed to flow the molding material out of the end of the molds and a part in the cavity is hardly sufficiently filled with the molding material, which leads to a tendency that a pressure inside the cavity does not increase and transfer defects occur. Thus, the open cavity method is preferably used to mold a molding material that does not flow even in a plastic state (referred to as non-flowable molding material in some cases). In molding of the non-flowable molding material by the open cavity method, since flowing of the molding material is not accompanied, it is natural that molding defects due to insufficient flowing do not occur, unlike the closed cavity method. However, in the open cavity method, since an edge portion that does not form a product is generated on an outer peripheral portion of the product, it is necessary to trim the outer peripheral portion of the product after molding; and also in a case where a shaped product having an uneven thickness portion or a deeply-drawn portion or a shaped product having a complicated shape is to be produced by a press molding using a non-flowable molding material, tension is strongly applied to a specific location of the molding material during mold clamping and the location is pulled out, thereby easily resulting in molding defects such as becoming thinner than a thickness of the cavity, that is, a designed thickness.

From this fact, it is economically suitable to mold a molding material having fluidity by a closed cavity method, as compared with molding with an open cavity method using a non-flowable molding material. However, there are two problems with the closed cavity method.

Firstly, an end portion of a product is formed by flowing of a molding material in a thermoplastic state, so that an orientation change of reinforcing fibers in a flow portion may occur and appearance change of the product or change of mechanical properties thereof may occur. Secondly, quality of the end portion of the product and yield of molding decrease, such as with occurrence of unfilled molding due to insufficient flowing. In order to solve these problems, PTL 1 proposes, although it is an injection molding, a method of providing a cavity end portion of a product with a surplus part, filling the surplus part with a melted resin and performing molding, and then trimming and finishing the surplus part. In this method, it is possible to improve appearance of the product portion by collecting cold slugs or the like, that are generated in a case of filling a closed cavity with a melted resin such as in injection molding, in a surplus part. However, it is not possible to prevent unfilling that is the problem of the closed cavity method as described above. PTL 2 proposes that a product having a good appearance is obtained by performing molding with the open cavity method and trimming an edge portion to obtain a product portion. This method can be applied to a press molding similarly to the present invention. However, due to the open cavity method, in a case where a molding material with good fluidity is used and a cavity internal pressure increases with mold clamping, the molding material flows out of an opening between mold mating surfaces, which makes it difficult to perform molding. Thus, the invention is achieved by molding a molding material, that does not flow even in a thermoplastic state, without increasing an internal pressure of the cavity. Therefore, in the above-described invention, it was difficult to stably produce a shaped product having a good appearance by press-molding a molding material containing reinforcing fibers and a thermoplastic resin as a matrix.

PTL 3 discloses molds for producing a fiber-reinforced thermoplastic resin shaped product by press-molding a sheet material in which a discontinuous fiber-reinforced thermoplastic resin layer is stacked on a part of at least one side of a continuous fiber-reinforced thermoplastic resin layer. In the mold, a frame-shaped dam portion for preventing the discontinuous fiber-reinforced thermoplastic resin layer from flowing outside of the cavity in a case where the molds are closed is provided on an outer peripheral edge of the cavity while a gap for extending the continuous reinforced thermoplastic resin layer to an outside of the cavity is formed. In a case where a fiber-reinforced thermoplastic resin shaped product is produced by using the mold, it hardly occurs that there is difficulty with mold opening during press molding and generation of burrs is suppressed. However, in the invention of PTL 3, the discontinuous fiber-reinforced thermoplastic resin layer becomes a plastic state and flows during press molding, and the flowing is stopped at the dam portion of the molds to form a part of the shaped product, and this means that with respect to the discontinuous fiber-reinforced thermoplastic resin layer, molding with the closed cavity method is practically performed. That is, in the invention of PTL 3, the problem of the above-mentioned closed cavity method is not solved.

PTL 4 discloses a method for press-molding a molding material composed of reinforcing fibers and a thermoplastic resin (hereinafter, unless otherwise noted, indicating a material for press molding) using molds consisting of a concave-portion mold having an opening and a flange portion and a convex-portion mold having a convex portion corresponding to the concave portion and configured to form a cavity with the concave-portion mold. The method includes a step of stacking and disposing at least two molding materials (A) and (B) each having the following shapes and being composed of reinforcing fibers and a thermoplastic resin, on molds which become a lower face of the mold, and a step of pressurizing the molding materials (A) and (B), which are stacked and disposed on the mold which becomes the lower face of the mold, using a mold which becomes an upper face of the mold.

Molding material (A): A shape having an area equal to or greater than a maximum area of the cavity described above.

Molding material (B): A shape having a projected area equal to or greater than at least a projected area of the opening of the concave portion Further, FIG. 8 of PTL 4 shows a mechanism for catching and fixing a molding material during mold clamping. This mechanism is a mechanism by which the molding material is caught and fixed before an upper mold comes into contact with the molding material, and in which a site to be fixed slides together with mold clamping. This mechanism prevents the molding material from being drawn during mold clamping and prevents an upper-layer molding material from being dislocated.

The invention of this PTL 4 is described as a press molding method which achieves both excellent workability that does not require complicated steps and excellent moldability that makes it easily possible to follow a complex shape of a mold, in a press molding using a molding material composed of reinforcing fibers and a thermoplastic resin.

However, the above invention requires two types of molding materials of the molding material (A) with a shape having an area equal to or greater than the maximum area of the cavity, and the molding material (B) with a shape having a projected area equal to or greater than at least a projected area of the opening of the concave portion. It can be seen from definitions of the molding material (A) and the molding material (B) that both of them have a size corresponding to a main part of a target shaped product. As long as small pieces of a patch-shaped molding material are partially stacked on a main molding material and press molding is performed, it may not be as complicated. However, as in the invention of PTL 4, a method for producing a shaped product, which includes preparing two molding materials of which sizes correspond to the main part of the target shaped product and are slightly different from each other, causing the molding materials to be in a plastic state, disposing the molding materials in molds under a specific state and condition, and performing press molding, is considerably complicated, and there is room for significant improvement in terms of workability and mass productivity in the production method.

CITATION LIST

Patent Literature

[PTL 1] US-A-2011/0193258
[PTL 2] Pamphlet of International Publication No. WO2015/064207
[PTL 3] JP-A-2013-67051
[PTL 4] JP-A-2009-196145

SUMMARY OF INVENTION

Technical Problem

An object of the present invention is to provide a method for producing a fiber-reinforced resin shaped product having an excellent appearance, with high productivity.

Solution to Problem

As a result of repeated intensive studies with respect to solutions of the above problems, the present inventors have recognized an influence of a pressure applied to an end portion of a molding material during press molding on moldability, and, based on this, have completed the present invention. A summary of the present invention is shown below.

The present invention provides a method for producing a fiber-reinforced resin shaped product, by mold clamping and press-molding a molding material containing reinforcing fibers and a thermoplastic resin as a matrix in molds having an upper mold and a lower mold, the method including: disposing the molding material, which is heated and is in a plastic state, between the upper mold and the lower mold; initiating the mold clamping to apply a force in a substantially mold clamping direction to a certain site of the molding material; starting deformation of the molding material in the substantially mold clamping direction; applying a force in the substantially mold clamping direction to a fixing site which is present in at least a part of a substantially outer peripheral end portion of the molding material but is different from the certain site; pressing and fixing the substantially outer peripheral end portion; and completing the mold clamping to obtain a fiber-reinforced resin shaped product having an edge portion (may simply referred to below as a shaped product with an edge portion).

Furthermore, the present invention provides a method for producing a fiber-reinforced resin processed product, including: cutting the edge portion included in the fiber-reinforced resin shaped product obtained by the above-mentioned production method.

Advantageous Effects of Invention

According to the method for producing a fiber-reinforced resin shaped product having an edge portion of the present invention, it is possible to produce a fiber-reinforced resin shaped product having an excellent appearance, with high productivity. Furthermore, in the production method of the present invention, a surface transfer property from molds to a shaped product is excellent.

BRIEF DESCRIPTION OF DRAWINGS

FIG. 6A is a schematic view of a state in which the molding material is disposed between the upper mold and the lower mold. FIG. 6B shows a schematic view of a state in which a mold clamping is initiated and a force in a substantially mold clamping direction is applied to a certain site of the molding material, thereby beginning deformation of the molding material in the substantially mold clamping direction, more specifically, a state in which a central portion periphery (substantially the central portion) of the molding material begins to be drawn into a space around a convex portion of the lower mold by a concave portion of the upper mold. FIG. 6C is a schematic view of a state in which a force in the substantially mold clamping direction is applied to a fixing site at a substantially outer peripheral end portion of the molding material, and the fixing site begins to be pressed and fixed. FIG. 6D is a schematic view of a state in which the mold clamping is completed.

DESCRIPTION OF EMBODIMENTS

Figure 1:
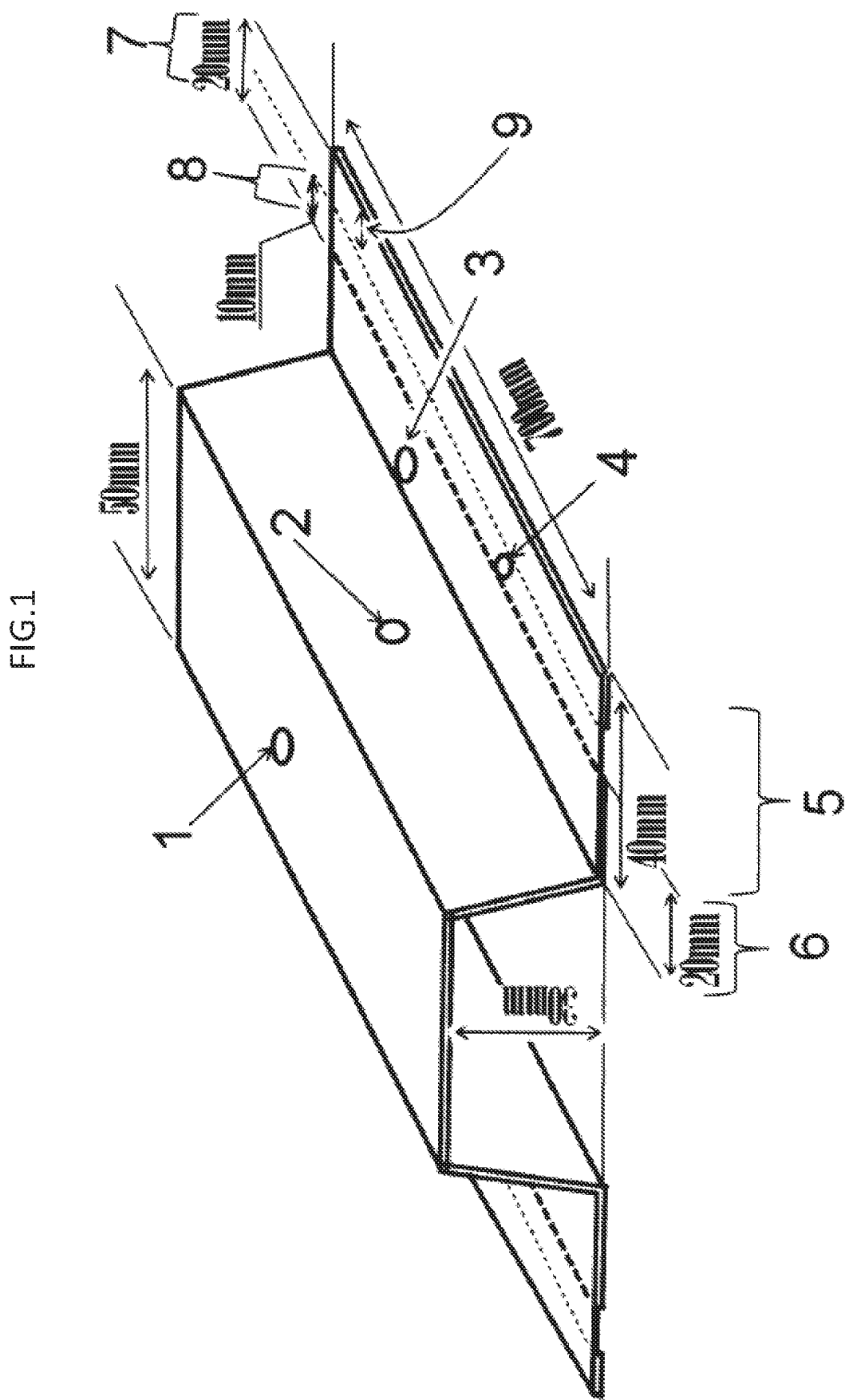
FIG. 1 is a schematic view of an example of a fiber-reinforced resin shaped product having an edge portion of the present invention (hat-shaped product having a height of 30 mm).

Hereinafter, embodiments of the present invention will be described in detail. However, the present invention should not be construed to be limited to technologies, drawings, and examples described below. The drawings are not limited to actual scales.

The present invention relates to a method for producing a fiber-reinforced resin shaped product by mold clamping and press-molding a molding material containing reinforcing fibers and a thermoplastic resin as a matrix in molds having an upper mold and a lower mold. The method includes: disposing the molding material, which is heated and is in a plastic state (according to the present invention, simply referred to as "in a thermoplastic state" or "in a plastic state" in some cases), between the upper mold and the lower mold; initiating mold clamping apply a force in a substantially mold clamping direction to a certain site of the molding material; starting deformation of the molding material in the substantially mold clamping direction; applying a force in the substantially mold clamping direction to a fixing site which is present in at least a part of a substantially outer peripheral end portion of the molding material but is different from the certain site, pressing the fixing site, preferably squashing and fixing the fixing site; and completing the mold clamping to obtain a fiber-reinforced resin shaped product having an edge portion. Here, the edge portion of the fiber-reinforced resin shaped product is formed, in press molding, by causing the fixing site of the molding material to be fixed due to application of a force in the substantially mold clamping direction and completing the mold clamping. A force being applied in the substantially mold clamping direction means that a force may be applied in a direction from the upper mold to the lower mold of the molds, in a direction from the lower mold to the upper mold of the molds, or in both directions therein.

With respect to the present invention, the term "substantially mold clamping direction" is basically a mold clamping direction; however, due to a shape of the molds, disposition of the molding material, or the like, it may be a direction in a case where the force applied to the molding material from the molds by mold clamping is somewhat deviated from the mold clamping direction. In a case where a numerical range is to be limited in the substantially mold clamping direction, as viewed in a certain plane including the mold clamping direction, a range of the mold clamping direction±45° is preferable, a range of the mold clamping direction±30° is more preferable, and a range of the mold clamping direction±15° is still more preferable.

With respect to the present invention, disposing the molding material between the upper mold and the lower mold means an operation exemplified such as by placing the molding material on the lower mold, and holding the molding material on the upper mold using the upper mold having an appropriate holding mechanism, such as holding the molding material in a space between the upper mold and the lower mold using a robot arm or the like, and any known method can be used without particular limitation.

With respect to the present invention, initiating the mold clamping applying a force in the substantially mold clamping direction to a certain site of the molding material, and deforming the molding material in the substantially mold clamping direction is a representatively exemplified by using molds with a cavity in which a concavo-convex shape such as a deeply-drawn portion is present, and performing mold clamping for the molding material in a thermoplastic state so that the molding material is deformed in the substantially mold clamping direction. In addition, even in a case of performing mold clamping for the molding material in a thermoplastic state using molds with a flat-shape cavity, it also includes, for example, one in which molds having a certain type of mechanism is used to apply a force in the substantially mold clamping direction to a certain site of the molding material, so that a periphery of the "certain site" is raised. The "certain site" of the molding material may be often a substantially central portion (product shape portion) of the molding material, but may be a substantially outer peripheral end portion of the molding material, or may be a single site or a plurality of sites. Such "certain site" may be referred to as an initial deformation site.

In the present invention, applying a force in the substantially mold clamping direction to a fixing site, which is present in at least a part of the substantially outer peripheral end portion of the molding material but is different from the certain site, and pressing, preferably squashing, the substantially outer peripheral end portion, means that, as described above, after initiating the mold clamping, applying a force in the substantially mold clamping direction to a certain site of the molding material in a thermoplastic state and deforming the molding material in the substantially mold clamping direction, and applying a force in the substantially mold clamping direction to the fixing site of the molding material using a mechanism such as a pinching portion at a mold cavity as described later, and pressing the molding material, preferably pressing, squashing, and fixing the molding material.

In the present invention, a press molding machine capable of performing mold clamping at a predetermined pressure by a hydraulic, electric, or mechanical mechanism can be used for press molding. Here, it is preferable that the predetermined pressure has a mold clamping force capable of applying a pressure of 5 MPa to 30 MPa, preferably 10 MPa to 20 MPa, to a projected area of a cavity portion.

In the present invention, an internal pressure of the cavity is also adjusted by a mold clamping force. Thus, it is preferably appropriately adjusted. In a case where the molding material which is heated and is in a plastic state is caught between the upper mold and the lower mold using a press molding facility, it is important that mold clamping is initiated to apply a force in a substantially mold clamping direction to a certain site of the molding material, the molding material begins to be deformed in the substantially mold clamping direction, then a force in the substantially mold clamping direction is applied to a fixing site which is present in at least a part of a substantially outer peripheral end portion of the molding material, the substantially outer peripheral end portion is pressed and fixed, and then the mold clamping is completed. To specifically describe Example 1 and the like, the fixing site of the molding material is fixed after the substantially central portion of the molding material begins to be drawn into a space around the convex portion of the lower mold by the concave portion of the upper mold, provided that the fixing is performed preferably before the mold clamping is completed.

The present invention makes it possible to produce a fiber-reinforced resin shaped product having an excellent appearance, with high productivity, and, due to an excellent surface transfer property from the molds to the shaped product in molding, makes it extremely easy to produce a fiber-reinforced resin shaped product having a fine pattern or a complex pattern on a surface thereof. This is an extremely unpredictable effect, since a technique of performing mold clamping by fixing an end portion of a molding material using a press molding technology in the related art has been regarded as suitable for obtaining a good shaped product.

A heating temperature of the molding material is a temperature equal to and higher than a temperature at which the molding material becomes a plastic state. Specifically, in a case where a thermoplastic resin as a matrix is an amorphous resin, the thermoplastic resin is heated to a temperature equal to or higher than a glass transition temperature thereof, and in a case where the thermoplastic resin is a crystalline resin, the thermoplastic resin is heated to a temperature equal to and higher than a melting point thereof. At this time, it is important to press, preferably press and squash, and fix the fixing site of the substantially outer peripheral end portion of the molding material before completion of mold clamping. As a technique of pressing and fixing, a mechanism, that mechanically moves a slide block of a pressing and squashing portion to the upper mold using a slide mechanism, and brings it into contact with the molding material and performs squashing before the mold clamping, is conceivable. However, as a method in the present invention, a technique of pressing, preferably squashing, the substantially outer peripheral end portion of the molding material by opening and closing operation of the molds using molds is preferable. Specifically, molds having a pinching portion at which the cavity has a smaller thickness than the substantially central portion of the cavity is used. The pinching portion is formed at the substantially outer peripheral end portion of the cavity using a block or the like that can be removed or replaced in a nest structure, and the molding material is disposed in the molds so that a fixing site which is at least a part of the substantially outer peripheral end portion of the molding material in a plastic state is pinched by the pinching portion at the cavity during mold clamping, thereby the fixing site, preferably the outer peripheral portion, of the molding material is pressed, preferably pressed and squashed, and fixed before compression of the cavity portion is initiated in a mold clamping operation.

In this case, as a pressure behavior in the pinching portion formed at the substantially outer peripheral end portion of the cavity, the pinching constant $Kp$ (MPa·cm$^2$/kN) represented by Expression (p) can be used as an index.

$$\{\text{Pinching portion maximum pressure (MPa)} \times \text{pinching portion area (cm}^2)/10\}/\text{mold clamping force (kN)} = \text{pinching constant } Kp \text{ (MPa·cm}^2\text{/kN)} \quad (p)$$

At this time, in a case where a value of the pinching constant $Kp$ (MPa·cm$^2$/kN) is preferably less than 0.5, and more preferably 0.3 or less. In a case where the pinching constant $Kp$ is less than 0.5, molding defects due to pressure reduction in the cavity caused by consumption of a mold clamping force to squash the pinching portion hardly occur, which is preferable. In a case where the pinching constant $Kp$ (MPa·cm$^2$/kN) is greater than 0.05, an effect of pressing a part of the substantially outer peripheral end portion of the molding material at the pinching portion decreases and a problem such as flowing of the molding material in a plastic state out of the pinching portion hardly occurs. That is, the pinching constant $Kp$ (MPa·cm$^2$/kN) is preferably more than 0.05, more preferably more than 0.05 and less than 0.5, and still more preferably more than 0.05 and less than 0.3.

With respect to a pressure applied to the pinching portion, specifically, an actual pressure can be measured by a pressure sensor installed on a pinching portion surface of the mold. An example for a method of adjusting such pinching portion pressure is to adjust clearance at the upper mold and lower mold at the pinching portion. A preferable size of the clearance at the pinching portion depends heavily on the molding material used. In a case of a molding material with a small amount of reinforcing fibers and a good fluidity, a required clearance is narrow Conversely, in a case of a molding material in which the amount of reinforcing fibers is large and the reinforcing fibers are entangled with one another to make flowing difficult, a required clearance is wide. As a specific and simple method of estimating the amount of clearance at the pinching portion from the molding material, a method in which a molding material of approximately 30 mm square is compressed, pressed, and squashed under a predetermined molding condition, and estimation is performed from a thickness of the pressed and squashed piece obtained is exemplified. In this case, it is desirable to set the clearance at 70% to 100%, preferably 80% to 90% of the thickness of the pressed and squashed piece obtained.

In the present invention, the substantially central portion in a shaped product with an edge portion and the substantially central portion of a cavity of molds that can be used for production of the shaped product with the edge portion does not refer to merely a middle part, but refers to a part having a shape and physical properties necessary for application of the shaped product with an edge portion. The portion is referred to as a product shape portion in some cases, and may be simply referred to as a central portion.

In the present invention, the substantially outer end portion in a cavity or the substantially outer end portion of a molding material is a location corresponding to an edge portion of a shaped product obtained therefrom, and is a part which is not in the substantially central portion. In a case of a complex cavity shape, the substantially outer peripheral end portion may be present near a center of the cavity or the molding material (with respect to a cross section as the molding material is viewed in the substantially mold clamping direction). The substantially outer peripheral end portion may be simply referred to as an outer peripheral end portion.

In the present invention, the pinching portion refers to a site formed at the substantially outer peripheral end portion of a cavity at which the cavity has a thickness smaller than a thickness of the substantially central portion of the cavity, in a case where molds begin to be clamped and the cavity is to be formed by upper mold and lower mold thereof, that is, before the mold clamping is completed. Depending on a shape of a target shaped product with an edge portion, the pinching portion may be formed at the entire outer periphery of the substantially outer peripheral end portion of the cavity, or may be formed at a part of the outer periphery thereof.

Figure 3:
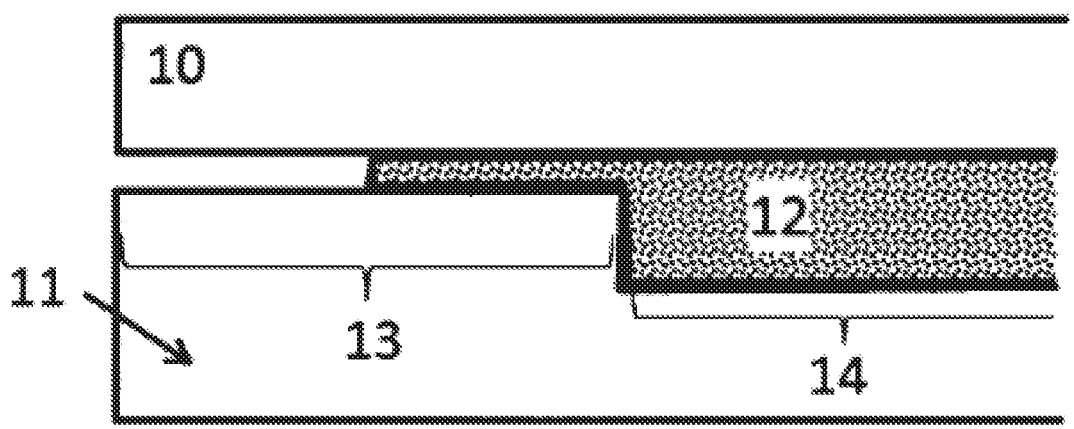
FIG. 3 is a schematic view of a cross section near a substantially outer peripheral end portion of molds, in which a pinching portion is formed up to an outermost side of the substantially outer peripheral end portion of a cavity.
Figure 4:
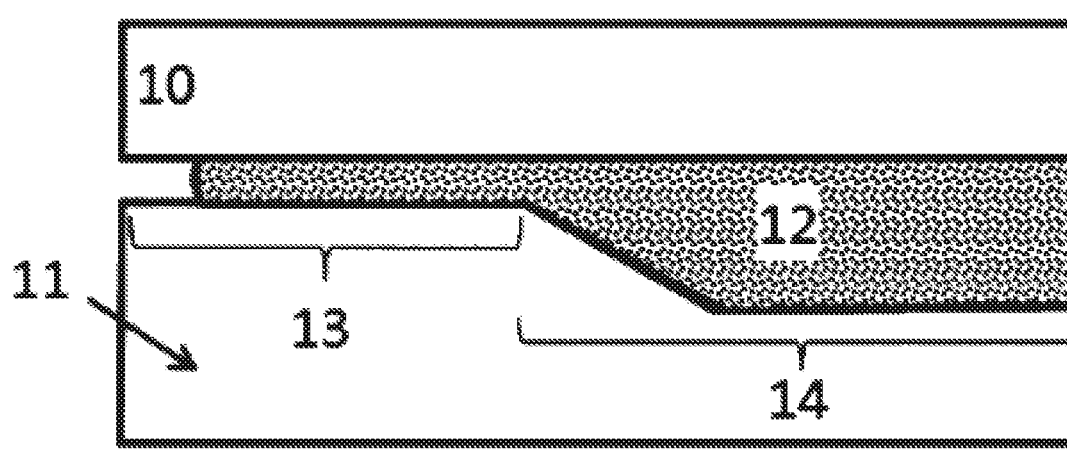
FIG. 4 is a schematic view of a cross section near a substantially outer peripheral end portion of molds with a cavity shape, in which an outermost portion of a substantially central portion (product shape portion) of the cavity gradually decreases in thickness of the cavity and leads to a pinching portion.

In the present invention, as the pinching portion, one formed up to an outermost side of the substantially outer peripheral end portion of the cavity is exemplified as the simplest mode (see FIG. 3). In a case of molds with a cavity shape in which an outermost portion of the substantially central portion (product shape portion) of the cavity gradually decreases in thickness of the cavity and leads to a pinching portion, it is easy to obtain a shaped product with an edge portion and having a superior appearance, which is preferable (see FIG. 4).

Figure 5:
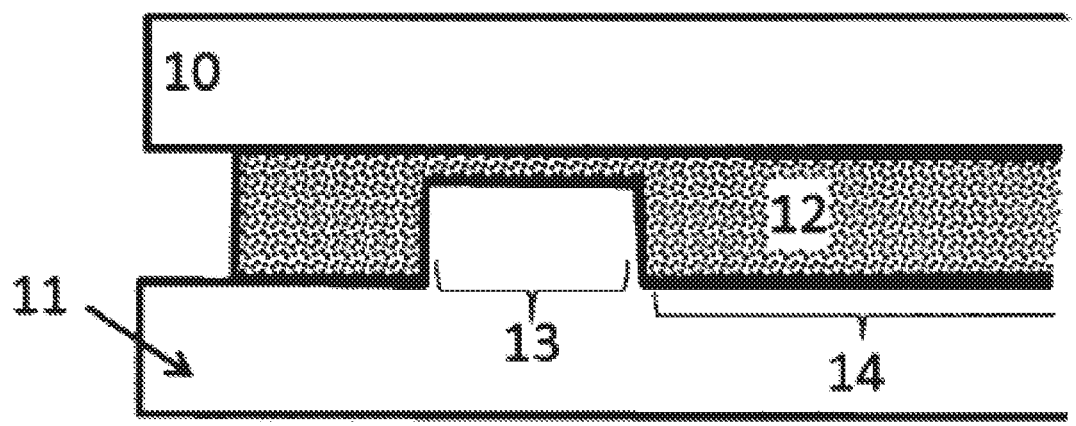
FIG. 5 is a schematic view of a cross section near a substantially outer peripheral end portion of molds with a cavity shape, in which a pinching portion is formed at a site which is not at an outermost side of a substantially outer peripheral end portion of the cavity, and an outermost cavity thickness of the substantially outer peripheral end portion of the cavity is larger than a thickness of the pinching portion.
Figure 6A:
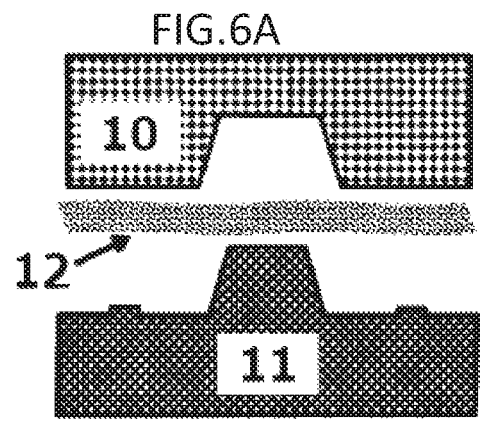
FIGS. 6A to 6D are schematic views showing cross sections as viewed in a direction perpendicular to a mold clamping direction of molds and in a longitudinal direction of a molding cavity, regarding operation of the molds and deformation of a molding material in a case of performing mold clamping and press-molding the molding material, which is heated and is in a plastic state, in the molds having an upper mold and a lower mold such as in Example 1.
Figure 6B:
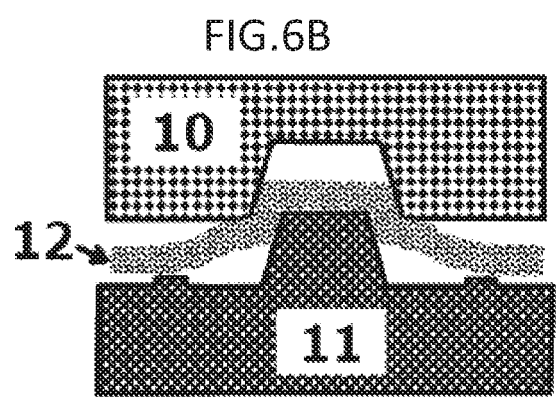
Figure 6C:
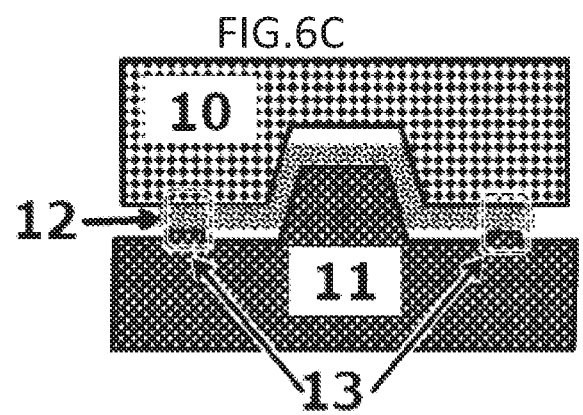
Figure 6D:
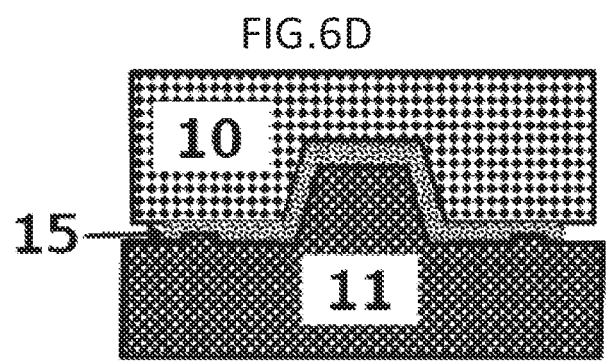

In the present invention, even with molds with a cavity shape in which a pinching portion is formed at a site which is not at an outermost side of the substantially outer peripheral end portion of the cavity, and, as a result, an outermost cavity thickness of the substantially outer peripheral end portion of the cavity is larger than a thickness of the cavity at the pinching portion, it is easy to obtain a shaped product with an edge portion and having a superior appearance, which is preferable (see FIG. 5).

The shaped product with an edge portion obtained by the production method of the present invention has an outer peripheral portion having a portion which corresponds to a site where the molding material is fixed by the pinching portion at the mold cavity during molding and an edge portion which corresponds to a site outside of the fixed site. The edge portion according to the present invention refers to a surplus portion which is not always necessary for application of a shaped product and is generated in the shaped product due to the method for producing a shaped product as described above. This edge portion contains a site formed by flowing of the molding material. Thus, there are many cases where a state such as an orientation of the reinforcing fibers is changed as compared with the product shape portion, and therefore appearance and physical properties thereof are changed as compared with the product shape portion. Therefore, after molds and a molding condition are set so that a target product shape is a substantially central portion of a shaped product and a shaped product having an edge portion on an outer peripheral portion of the substantially central portion is obtained, in a case where, first, the shaped product having an edge portion is obtained by press molding, and then the edge portion is cut so that a shaped product with a target shape is obtained, the shaped product exhibits a good appearance and physical properties, which is preferable. A fiber-reinforced resin shaped product with a target product shape and having no edge portion is referred to as a fiber-reinforced resin processed product in some cases. A method of cutting the above-mentioned edge portion is not particularly limited, and it is possible to use known methods, for example, physical cutting such as a circular saw, a band saw, a Leutor, and an end mill, and thermal cutting such as ultrasonic wave and laser. Even for a case where a shaped product with an edge portion is used as such for a product for the reasons such as presence of a site which is not required and is determined to be an edge portion for a certain application, but has a preferable effect in another application, the case is included in the present invention. It is also possible to use an edge portion included in a shaped product for joining with other members, such as mechanical fastening using bolts and nuts, or vibration welding.

According to the production method of the present invention, by appropriately designing the fixing site, it is possible to provide a shaped product with a small edge portion which is hardly obtained in a press molding using an open cavity method.

An effect of the present invention is particularly remarkably exerted in a case where a shaped product with a product shape having concaves and convexes is obtained. This is because drawing of the molding material during the above-mentioned press molding easily occurs as concaves and convexes are large, and defects such as unintended wrinkles easily occur in the shaped product. In a case of using a press molding to obtain a shaped product having only concaves and convexes which make a height difference equal to or less than a thickness of a product shape portion of the shaped product, drawing of the molding material hardly occurs. In a case of obtaining a shaped product having concaves and convexes which make a height difference equal to or greater than the thickness by press molding, the drawing of the molding material easily occurs. This drawing is caused by a difference between a projected area of the cavity and an actual area thereof.

In the production method of the present invention, by using molds in which a cavity has a planar-shape portion and a non-planar-shape portion in a cavity cross-sectional shape viewed in a substantially vertical direction with respect to a substantially mold clamping direction, and a distance between a position at a surface of the planar-shape portion and a position at a surface of the non-planar-shape portion which continues to the surface of the planar-shape portion in the substantially mold clamping direction is larger than a thickness of the substantially central portion of the cavity, as described above, it is possible to preferably produce a fiber-reinforced resin shaped product having an edge portion and having a product portion shape with irregularities. With respect to the present invention, the substantially vertical direction with respect to the substantially mold clamping direction may be not strictly 90° with respect to the substantially mold clamping direction. In a case where a numerical range is to be limited in the substantially vertical direction with respect to the mold clamping direction, as viewed in a certain plane including a 90° direction with respect to the substantially mold clamping direction, a range of 90°±450 with respect to the substantially mold clamping direction is preferable, a range of 90°±30° with respect to the substantially mold clamping direction is more preferable, and a range of 90°±15° with respect to the substantially mold clamping direction is still more preferable.

In the present invention, as a press molding, a so-called cold press molding is preferable due to high productivity, in which a shaped product is obtained by disposing a fiber-reinforced resin material, which is heated just before molding and is in a plastic state, in molds regulated to be less than a plasticizing temperature of the fiber-reinforced resin material, and performing mold clamping. As a method for heating the fiber-reinforced resin material, a hot-air heater, an infra-red heating device, or the like is used. A specific example of the cold press molding is as follows: A fiber-reinforced resin material is heated to a plasticizing temperature, which is equal to or higher than a softening temperature of the thermoplastic resin as a matrix thereof+30° C. and equal to or less than a decomposition temperature thereof, to bring it into a plastic state, then disposed in molds which are composed of a pair of an upper mold and a lower mold and adjusted to a temperature equal to or lower than the softening temperature of the thermoplastic resin, mold-clamped and pressurized, the molds are opened, and a shaped product, which is cooled and solidified, is removed from the mold.

In the above-mentioned cold press molding, a temperature (heating temperature) at which the fiber-reinforced resin material is heated and brought into a plastic state is preferably equal to and higher than a softening temperature thereof+15° C. to a decomposition temperature thereof–30° C. In a case where the heating temperature is in the above range, the matrix resin is sufficiently melted and plasticized to be easily molded, and almost no decomposition of the thermoplastic resin proceeds, which is preferable.

By using the production method of the present invention, it is possible to suppress generation of excessive wrinkles in a shaped product, and thus it is possible to obtain a shaped product with a uniform thickness and having a product shape with irregularities, at a low pressure. In the present invention, in a case of press molding, in particular, cold press molding, as a pressurizing condition, a press pressure is preferably 0.1 MPa to 20 MPa, more preferably 0.2 MPa to 15 MPa. and still more preferably 0.5 MPa to 10 MPa. In a case where the press pressure is 0.1 MPa or more, since the fiber-reinforced resin material is sufficiently pressurized, springback and the like hardly occur and a material strength is less likely to decrease. In addition, in a case where the pressure is 20 MPa or less, for example, even for a large fiber-reinforced resin material, press molding can be often performed by a more general press machine, rather than a very large special press machine, which is economically preferable. In addition, a temperature inside the molds during pressurization depends on a type of the fiber-reinforced resin material. However, since a melted fiber-reinforced resin material is cooled and solidified, and the fiber-reinforced resin shaped product is formed, it is preferable that the temperature is lower by 20° C. or less than a softening temperature of the thermoplastic resin as a matrix of the fiber-reinforced resin material. In the present invention, the softening temperature of the resin is a crystal melting temperature, that is, a so-called melting point for a crystalline thermoplastic resin, and a glass transition temperature for an amorphous thermoplastic resin.

With respect to mechanism by which an effect of the production method of the present invention is exerted, the present inventors have considered the following: In the present invention, by providing a part where a pressurizing force locally changes during press molding, it is possible to perform molding of an uneven thickness shaped product and molding with excellent mold transfer property by increasing an internal pressure of the cavity to cause flowing, which are advantages of the closed cavity method, and according to the present invention, it is possible to improve unfilled molding which is a drawback of the closed cavity method and changes of appearance and physical properties in an end portion of the product.

In the press molding according to the present invention, it is preferable that the molding material which is a plate-like one is disposed on an upper surface of the lower mold, and then the upper mold is closed and pressurized to fill the molding material into the entire cavity and perform shaping. Here, in a case where, in particular, a shaped product having concaves and convexes is produced, the molding material disposed on the upper surface of the lower mold is pressed by a convex portion of the upper mold simultaneously with the mold clamping, and a phenomenon in which the molding material is drawn to the concave portion of the lower mold occurs. In technologies in the related art, this drawing phenomenon occurs unstably in the molding process. Thus, in a case where the molding material is partially drawn and the amount thereof increases, such part becomes a defective location of a shaped product which is not filled with the molding material. Conversely, in a case where the amount of the drawn molding material decreases, the molding material protrudes up to the outer peripheral portion of the cavity and is caught by a shear edge portion which constitutes the closed cavity, resulting in molding defects. In the present invention, after the molding material is drawn at an initial stage of mold clamping, by fixing the molding material in the outer peripheral portion of the cavity before the mold clamping is completed, it is possible to eliminate unfilled molding defects and to prevent disorders of appearance and physical properties generated in an end portion of a product.

(Molding Material Containing Reinforcing Fibers and a Thermoplastic Resin as a Matrix)

As a molding material (with respect to the present invention, referred to as a fiber-reinforced resin material in some cases) containing reinforcing fibers and a thermoplastic resin as a matrix used in the present invention, it is possible to preferably use known ones.

The abundance of the thermoplastic resin as a matrix in the fiber-reinforced resin material can be appropriately determined depending on a type of the thermoplastic resin, a type of the reinforcing fibers, and the like, and is not particularly limited. Usually, the thermoplastic resin is preferably in a range of 3 parts by weight to 1,000 parts by weight, more preferably 30 to 200 parts by weight, and still more preferably 30 to 150 parts by weight, with respect to 100 parts by weight of the reinforcing fibers. In a case where the amount of the thermoplastic resin as a matrix is 3 parts by weight or more with respect to 100 parts by weight of the reinforcing fibers, impregnation of the resin in the fiber-reinforced resin material is sufficient and dry reinforcing fibers decrease. In a case where the amount of the thermoplastic resin as a matrix is 1,000 parts by weight or less, the amount of reinforcing fibers is sufficient and it is often appropriate as a structural material. With respect to the present invention, for convenience, the term "weight" is used, but it is actually the mass.

Examples of an orientation state of the reinforcing fibers in the fiber-reinforced resin material can include a unidirectional orientation in which a long-axis direction of the reinforcing fibers is oriented in one direction, and a two-dimensional random orientation in which the long-axis direction is randomly oriented in an in-plane direction of the fiber-reinforced resin material.

The orientation state of the reinforcing fibers in the fiber-reinforced resin material used in the present invention may be any of the unidirectional orientation or the two dimensional random orientation. An irregular orientation (oriented state in which the long-axis direction of the reinforcing fibers is not completely oriented in one direction and is not perfectly random) in the middle of the unidirectional orientation and the two-dimensional random orientation may be used. Depending on a fiber length of the reinforcing fibers, the long-axis direction of the reinforcing fibers may be oriented so as to have an angle with respect to the in-plane direction of the fiber-reinforced resin material; it may be oriented so that the reinforcing fibers are entangled cotton-like; and it may be oriented so that the reinforcing fibers are biaxial woven fabrics such as plain weave and twill weave, multiaxial woven fabrics, nonwoven fabrics, mats, knits, braids, or paper made of reinforcing fibers.

In particular, in a case of numerically defining that the reinforcing fibers contained in the fiber-reinforced resin material or the shaped product with an edge portion are in the two-dimensional random orientation, as disclosed in JP-A-2012-246428, a preferable two-dimensional random orientation for the reinforcing fibers may be set as a state where a degree of plane orientation σ is 90% or more, in which the degree of plane orientation σ is defined by σ=100×(1−(number of reinforcing fibers having plane orientation angle γ of 10° or more)/(total number of reinforcing fibers)).

Further, with respect to any rectangular region in a cross section obtained by cutting the shaped product specimen in a thickness direction, the thickness direction of the shaped product or a direction different from the thickness direction of the shaped product is set as a Z direction, and observation, measurement, and calculation of degree of plane orientation σ for the reinforcing fibers may be performed according to the above publication. In that case, regarding an angle between the long-axis of the reinforcing fiber cross section and the surface of a molding plate, which is necessary for calculating the plane orientation angle γ, an angle between the long-axis of the reinforcing fiber cross section and an upper side or lower side of a rectangular region to be observed, rather than the surface of a molding plate, may be used.

In the present invention, reinforcing fiber mats mean those obtained by causing reinforcing fibers to be deposited or entangled with one another to form a mat. As the reinforcing fiber mat, a two-dimensional random reinforcing fiber mat in which a long-axis direction of the reinforcing fibers is randomly oriented in an in-plane direction of a fiber-reinforced resin material, or a three-dimensional random reinforcing fiber mat in which the reinforcing fibers are, for example, entangled cotton-like so that the long-axis direction of the reinforcing fibers is randomly oriented in each direction of XYZ.

In the present invention, an isotropic base material is one in which a thermoplastic resin is contained in the reinforcing fiber mat. In the isotropic base material of the present invention, as a mode in which the thermoplastic resin is contained in the reinforcing fiber mat, for example, a mode in which a powdery, fibrous, or bulky thermoplastic resin is contained in the reinforcing fiber mat, or a mode in which a thermoplastic resin layer containing a thermoplastic resin is mounted or stacked on the reinforcing fiber mat can be mentioned. An isotropic base material, in which the reinforcing fiber mat is a two-dimensional random reinforcing fiber mat, is referred to as an in-plane isotropic base material in some cases.

In the fiber-reinforced resin material used in the present invention, reinforcing fibers with different orientation states may be contained in one fiber-reinforced resin material. As a mode in which reinforcing fibers with different orientation states are contained in a fiber-reinforced resin material, for example, (i) a mode in which reinforcing fibers with different orientation states are disposed in an in-plane direction of the fiber-reinforced resin material, and (ii) a mode in which reinforcing fibers with different orientation states are disposed in a thickness direction of the fiber-reinforced resin material, can be mentioned. In addition, in a case where the fiber-reinforced resin material has a stacked structure composed of a plurality of layers, (iii) a mode in which orientation states of reinforcing fibers contained in the respective layers are different can be mentioned. Modes in which the above respective modes (i) to (iii) are combined can also be mentioned.

An orientation mode of the reinforcing fibers in the fiber-reinforced resin material can be determined, for example, by performing a tensile test with reference to a predetermined direction of the fiber-reinforced resin material and a direction orthogonal thereto, to measure a tensile modulus, and then calculating a ratio (Eδ) obtained by dividing a larger one by a smaller one among the measured tensile modulus values. As the ratio of the elasticities is closer to 1, it can be evaluated that the reinforcing fibers are oriented isotropically. In a case where the ratio obtained by dividing a larger one by a smaller one among the values of the elasticities in two orthogonal directions does not exceed 2, it is evaluated as being in-plane isotropic. In a case where this ratio is less than 1.5, it is evaluated as being excellent in in-plane isotropy. In a case where this ratio does not exceed 1.3, it is evaluated as being particularly excellent in in-plane isotropy.

An areal weight of the reinforcing fibers in the fiber-reinforced resin material is not particularly limited, and a lower limit thereof is usually 25 g/m² to 10,000 g/m². In a case where a fiber-reinforced resin material is press-molded to produce a shaped product with an edge portion, unless reinforcing fibers or a molding material is added, the areal weight of the reinforcing fibers in the fiber-reinforced resin material can be regarded as an areal weight of the reinforcing fibers in the obtained shaped product with an edge portion.

A thickness of the fiber-reinforced resin material used in the present invention is not particularly limited, and is usually preferably in a range of 0.01 mm to 100 mm, preferably in a range of 0.01 mm to 5 mm, and more preferably in a range of 1 mm to 5 mm.

In a case where the fiber-reinforced resin material used in the present invention has a structure in which a plurality of layers are stacked on top of each other, the thickness does not indicate a thickness of each layer, but a thickness of the entire fiber-reinforced resin obtained by totaling the thicknesses of the respective layers.

The fiber-reinforced resin material used in the present invention may have a single layer structure composed of a single layer or may have a stacked structure in which a plurality of layers are stacked on top of each other.

As a mode in which the fiber-reinforced resin material has the above-described stacked structure, a mode in which a plurality of layers having the same composition are stacked on top of each other may be adopted, or a mode in which a plurality of layers having different compositions are stacked on top of each other may be adopted.

Further, as a mode in which the fiber-reinforced resin material has the above-described stacked structure, a mode in which layers having different oriented states of reinforcing fibers are stacked on top of each other may be adopted. As such a mode, for example, a mode obtained by stacking, on top of each other, a layer in which reinforcing fibers are unidirectionally oriented and a layer in which reinforcing fibers are two-dimensionally randomly oriented can be mentioned.

In a case where three or more layers are stacked on top of each other, a sandwich structure composed of a predetermined core layer and a skin layer stacked on each of front and back surfaces of the core layer may be used.

The fiber-reinforced resin material used in the present invention may contain additives such as various non-fibrous or fibrous fillers of organic fiber or inorganic fiber, a flame retardant, a UV-resistant agent, a stabilizing agent, a release agent, a pigment, a softening agent, a plasticizer, and a surfactant, to the extent that an object of the present invention is not impaired.

A volume fraction of the reinforcing fibers contained in the molding material (fiber-reinforced resin material) used in the production method of the present invention and the shaped product with an edge portion obtained by the production method of the present invention is not particularly limited. In at least one of the molding material and the shaped product with an edge portion, the volume fraction (Vf) of the reinforcing fibers with respect to the reinforcing fibers and the thermoplastic resin as a matrix, defined by Expression (u) is preferably 5% to 80%, and Vf is more preferably 20% to 60%.

Vf=100×(volume of reinforcing fibers)/((volume of reinforcing fibers)+(volume of thermoplastic resin))          Expression (u)

In a case where Vf of the molding material or the shaped product with an edge portion is higher than 5%, a reinforcing effect due to the reinforcing fibers is sufficiently exhibited, which is preferable, and in a case where Vf is 80% or less, voids are hardly generated in a shaped product with an edge portion, and as a result, a possibility of decreased physical properties is reduced, which is preferable. In a case of a molding material or a shaped product with an edge portion which has a different Vf depending on a site thereof, it is preferable that an average value of Vf's falls within the above range, and it is more preferable that both the minimum value and the maximum value of Vf's are in the above range.

As described elsewhere, in a case of obtaining a shaped product with an edge portion by molding a molding material, unless, in addition to the molding material, another molding material, reinforcing fibers, a thermoplastic resin, or the like is added in molding, Vf of the molding material can be regarded as Vf of the shaped product with an edge portion.

The molding material (fiber-reinforced resin material) used in the present invention preferably has a tensile elongation at break $\varepsilon_v$ of 105% to 400%, more preferably 105% to 260%, and still more preferably 110% to 230%. In a case where the molding material has a tensile elongation at break $\varepsilon_v$ of 105% or more, it hardly tears even with bending or the like at the time of being disposed in molds, which is preferable. In a case where the molding material has a tensile elongation at break e, of 400% or less, at the time of transporting the molding material in a plastic state such as grabbing it with a robot arm, it hardly occurs that the molding material hangs down due to its own weight and severely deformed, which is preferable.

Here, the tensile elongation at break $E_v$ of the molding material is an elongation of the molding material at the time of being elongated at a tensile speed of 20 mm/sec and at a temperature equal to or higher than a softening temperature of the thermoplastic resin as the matrix of the molding material and is represented by Expression (e).

$\varepsilon_v$(%)=100×length after elongation of molding material/length before elongation of molding material          (e)

More specifically, the molding material is heated to a temperature equal to or higher than a softening temperature of the thermoplastic resin as a matrix; the molding material is disposed on molds for press molding for measuring tensile elongation at break $\varepsilon_v$, the molds are closed at a molding clamping speed of 20 mm/sec until the molding material is broken; the molding material is taken out; a length of the molding material elongated is measured; and the length of the molding material is divided by a length before elongation to perform calculation.

(Reinforcing Fibers)

Although carbon fibers are preferable as the reinforcing fibers contained in the fiber-reinforced resin shaped product with an edge portion of the present invention and the fiber-reinforced resin material, any of inorganic fibers or organic fibers other than the carbon fibers can be used depending on a type of a matrix resin, applications of a fiber-reinforced resin material, or the like.

Examples of the inorganic fibers other than the carbon fibers can include mineral fibers such as activated carbon fibers, graphite fibers, glass fibers, tungsten carbide fibers, silicon carbide fibers (silicon carbide fibers), ceramic fibers, alumina fibers, natural fibers, and basalt, boron fibers, boron nitride fibers, boron carbide fibers, and metal fibers.

Examples of the metal fibers can include aluminum fibers, copper fibers, brass fibers, stainless steel fibers, and steel fibers.

Examples of the glass fibers can include those made of E glass, C glass, S glass, D glass, T glass, quartz glass fibers, borosilicate glass fibers, or the like.

Examples of the organic fibers can include fibers made of a resin material such as aramid, polyparaphenylene benzoxazole (PBO), polyphenylene sulfide, polyester, acrylic, polyamide, polyolefin, polyvinyl alcohol, or polyarylate.

The reinforcing fibers contained in the shaped product with an edge portion or the fiber-reinforced resin material according to the present invention are one or more reinforcing fibers selected from the group consisting of carbon fibers, glass fibers, aramid fibers, boron fibers, and basalt fibers, and those in a weight average fiber length range as described later are more preferable.

In the present invention, two or more types of reinforcing fibers may be used in combination. In this case, plural types of inorganic fibers may be used in combination, plural types of organic fibers may be used in combination, and inorganic fibers and organic fibers may be used in combination.

As a mode in which a plurality of types of inorganic fibers are used in combination, for example, a mode in which carbon fibers and metal fibers are used in combination, a mode in which carbon fibers and glass fibers are used in combination, and the like can be mentioned. On the other hand, as a mode in which a plurality of types of organic fibers are used in combination, for example, a mode in which aramid fibers and fibers made of another organic material are used in combination can be mentioned. Further, as a mode in which the inorganic fibers and the organic fibers are used in combination, for example, a mode in which the carbon fibers and the aramid fibers are used in combination can be mentioned.

In the present invention, as the reinforcing fibers, carbon fibers are preferable. This is because the carbon fibers make it possible to obtain a fiber-reinforced resin material that is lightweight and excellent in strength.

As the carbon fibers, in general, polyacrylonitrile (PAN)-based carbon fibers, petroleum pitch-based carbon fibers, coal pitch-based carbon fibers, rayon-based carbon fibers, cellulose-based carbon fibers, lignin-based carbon fibers, phenol-based carbon fibers, vapor-grown carbon fibers, and the like are known, and any of these carbon fibers can be suitably used in the present invention.

Among these, in the present invention, it is preferable to use polyacrylonitrile (PAN)-based carbon fibers from the viewpoint of an excellent tensile strength. In a case where PAN-based carbon fibers are used as the reinforcing fibers, a tensile modulus thereof is preferably in a range of 100 GPa to 600 GPa, more preferably in a range of 200 GPa to 500 GPa, and still more preferably in a range of 230 GPa to 450 GPa. In addition, a tensile strength thereof is preferably in a range of 2,000 MPa to 10,000 MPa, and more preferably in a range of 3,000 MPa to 8,000 MPa.

The reinforcing fibers used in the present invention may have a sizing agent adhered to a surface thereof in order to improve adhesiveness to a matrix resin. In a case of using reinforcing fibers to which a sizing agent is adhered, a type of the sizing agent can be appropriately selected depending on types of the reinforcing fibers and the matrix resin, and is not particularly limited.

An adhesion strength between reinforcing fibers and a matrix resin is desirably 5 MPa or more in terms of strength in a strand tensile shear test. In addition to selection of the matrix resin, for example, in a case where the reinforcing fibers are carbon fibers, such strength can be improved by a method of changing a surface oxygen concentration ratio (O/C), a method of increasing an adhesion strength between carbon fibers and a matrix resin by applying a sizing agent to the carbon fibers, or the like.

In the present invention, in a case where at least a part of the reinforcing fibers is in the form of a single fiber, an effect thereof becomes extremely remarkable. On the other hand, in order to increase fluidity of a fiber-reinforced resin material, it is preferable that a shape of a part of the reinforcing fibers forms a bundle of single fibers. The reinforcing fibers may be a shape of a single fiber or a single fiber bundle shape. However, in a case of having both of them, a more effect of the present invention can be obtained. The term "single fiber bundle" means that two or more reinforcing single fibers are brought into close proximity to one another due to a bundling agent, an electrostatic force, or the like, and are present in a bundle shape. The number of reinforcing single fibers forming the bundle of single fibers is preferably 280 or more, and more preferably 600 or more.

In the present invention, in a case where single fiber bundle-shape reinforcing fibers are used, the number of single fibers constituting each single fiber bundle may be substantially uniform or different from one another in the respective single fiber bundles.

A weight average fiber length of the reinforcing fibers contained in the shaped product with an edge portion and the fiber-reinforced resin material of the present invention is preferably 0.1 mm to 500 mm from the viewpoint of both strength and productivity. The weight average fiber length is more preferably 1 mm to 100 mm, still more preferably 5 mm to 100 mm, and even more preferably 10 mm to 100 mm.

As the reinforcing fibers used in the present invention, not only discontinuous fibers having a weight average fiber length of 100 mm or less, which are excellent in in-plane isotropy of strength and dimensions as described above may be used, but also continuous fibers may be used depending on purposes.

In the present invention, reinforcing fibers having different fiber lengths may be used in combination. In other words, the reinforcing fibers used in the present invention may have a single peak or a plurality of peaks in an average fiber length.

For example, the average fiber length of the reinforcing fibers can be obtained by measuring fiber lengths of 100 fibers randomly extracted from the fiber-reinforced resin material up to a unit of 1 mm using a caliper or the like and performing calculation based on Expressions (m) and (f). A method of extracting the reinforcing fibers from the fiber-reinforced resin material can be performed, for example, by subjecting the fiber-reinforced resin material to a heat treatment at approximately 500° C.×1 hour and removing the resin in a furnace.

$$\text{Number average fiber length } Ln=\Sigma Li/j \tag{m}$$

(in the expression, Li is a fiber length of each of the reinforcing fibers and j is the number of the reinforcing fibers)

$$\text{Weight average fiber length } Lw=(\Sigma Li^2)/(\Sigma Li) \tag{f}$$

(in the expression, Li is a fiber length of each of the reinforcing fibers)

In a case where the fiber lengths are constant, such as being cut with a rotary cutter, the number average fiber length can be regarded as a weight average fiber length.

In the present invention, either the number average fiber length or the weight average fiber length may be adopted. However, it is often the weight average fiber length that can more accurately reflect physical properties of the fiber-reinforced resin material.

A single fiber diameter of the reinforcing fibers used in the present invention may be appropriately determined according to a type of the reinforcing fibers, and is not particularly limited.

In a case where carbon fibers are used as the reinforcing fibers, the average single fiber diameter is usually preferably in a range of 3 μm to 50 μm, more preferably in a range of 4 μm to 12 μm, and still more preferably in a range of 5 μm to 8 μm.

On the other hand, for example, in a case where glass fibers are used as the reinforcing fibers, the average diameter of single fibers is usually preferably in a range of 3 μm to 30 μm.

Here, the average diameter of single fibers refers to a diameter of a single fiber of the reinforcing fibers as the name implies. However, in a case where the reinforcing fibers are bundles of single fibers, the average diameter of single fibers may also be abbreviated as an average fiber diameter.

The average diameter of single fibers of the reinforcing fibers can be measured, for example, by the method described in JIS R 7607 (2000).

As described above, the reinforcing fibers used in the present invention preferably include those of a single fiber bundle shape, that is, those in which two or more reinforced single fibers are brought into close proximity to one another due to a bundling agent, an electrostatic force, or the like and are present in a bundle shape. With respect to the present invention, reinforcing fibers of a single fiber bundle shape are referred to as a reinforcing fiber bundle for convenience in some cases. One reinforcing fiber bundle functions as one filler in a fiber-reinforced resin shaped product or a molding material thereof. In a case where one obtained by randomly collecting individual reinforcing fibers with a tweezer or the like from a reinforcing fiber specimen that has been obtained from a fiber-reinforced resin shaped product or a molding material by removing a thermoplastic resin as a matrix thereof, is a plurality of bundles of single fibers, this can be regarded as a reinforcing fiber bundle.

As the reinforcing fiber bundle, one in which a plurality of single fibers are oriented approximately in the same direction and longitudinal side faces thereof are brought into contact with one another to be in a bundle shape is representative, but the present invention is not limited to this form. For example, a bundle shape, in which a plurality of single fibers are oriented in various directions, may be adopted, and a bundle shape, in which a plurality of single fibers are close to one another on a part of the longitudinal side faces, and single fibers are separated from one another at parts other than that, may also be adopted. In a case where the reinforcing fibers used in the present invention are a single fiber bundle shape, the number of single fibers constituting each bundle of single fibers is not particularly limited, and is usually in a range of 2 to 100,000.

For example, in general, carbon fibers are a single fiber bundle shape in which several thousands to several tens of thousands of single fibers are gathered. In a case where carbon fibers or the like are used as the reinforcing fibers, upon using a bundle of single fibers as it is, an entanglement part of the bundle of single fibers may become locally thick and thus make it difficult to obtain a thin-walled fiber-reinforced resin material. Therefore, in a case where single fiber bundle-shape reinforcing fibers are used, it is usual to use the bundle of single fibers by widening or opening the same.

In a case where the single fiber bundle-shape reinforcing fibers are widened or opened, for the reinforcing fibers in the present invention, a proportion of the reinforcing fibers (A) composed of the number of single fibers equal to or more than a critical single fiber number defined by Expression (1) is preferably 20 vol % or more, more preferably 30 vol % or more, still more preferably 40 vol % or more, and particularly preferably 50 vol % or more, with respect to a total amount of the reinforcing fibers.

$$\text{Critical single fiber number} = 600/D \qquad (1)$$

(in the expression, D is an average fiber diameter (μm) of the reinforced single fibers).

As reinforcing fibers other than the reinforcing fibers (A), there may be one in a single fiber state or a bundle composed of the number of single fibers smaller than a critical single fiber number, hereinafter referred to as reinforcing fibers (B) in some cases. With respect to the reinforcing fibers used in the present invention, it is possible to reduce a thickness of the reinforcing fibers (A) composed of equal to or greater than a specific number of single fibers and to reduce unevenness in thickness of the fiber-reinforced resin material by setting the number of bundles of the reinforcing fibers (A) per unit weight (g) of the reinforcing fibers to be in a specific range. Thus, by molding a fiber-reinforced resin material containing such reinforcing fibers, it is possible to obtain a fiber-reinforced resin shaped product that is excellent in mechanical properties even with a thin thickness.

In a case where a proportion of the amount of the reinforcing fibers (A) to a total amount of the carbon fibers is 20 vol % or more, it is easy to obtain a good-quality shaped product having a high volume fraction of reinforcing fibers at the time of molding the fiber-reinforced resin material of the present invention, which is preferable. On the other hand, an upper limit of the proportion of the amount of the reinforcing fibers (A) is preferably 99 vol %. In a case where the proportion of the amount of the reinforcing fibers (A) to the total amount of the fibers is 99 vol % or less, it is possible to obtain a composite material which does not have a large fiber gap and is excellent in mechanical strength. The proportion of the amount of the reinforcing fibers (A) to the total amount of the reinforcing fibers is more preferably equal to or greater than 50 vol % and less than 99 vol %, and still more preferably equal to or greater than 60 vol % and equal to or less than 90 vol %. That is, an upper limit of the proportion of the amount of the reinforcing fibers (A) to the total amount of the reinforcing fibers is more preferably 95 vol % or less, and still more preferably 90 vol % or less.

As described above, since the reinforcing fibers (A) are a reinforcing single fiber bundle-shape, it is also referred to as a reinforcing fiber bundle (A) for convenience in some cases. Similarly, the average number of single fibers of the reinforcing fibers (A) is abbreviated as an average fiber number in some cases.

(Thermoplastic Resin)

In the shaped product with an edge portion and the fiber-reinforced resin material according to the present invention, a thermoplastic resin is contained as a matrix resin. Further, in the present invention, a thermosetting resin may be used in combination as a matrix resin in a range of containing a thermoplastic resin as a main component.

The thermoplastic resin is not particularly limited, and those having a desired softening temperature can be appropriately selected and used depending on applications or the like of the shaped product with an edge portion and a processed product thereof.

As the thermoplastic resin, those having a softening temperature in a range of 180° C. to 350° C. are usually preferably used. However, the present invention is not limited thereto. In the present invention, the softening temperature of the thermoplastic resin is a crystal melting temperature, that is, a so-called melting point for a crystalline thermoplastic resin, and a glass transition temperature for an amorphous thermoplastic resin.

Examples of the thermoplastic resin can include one or more selected from the group consisting of polyolefin resins, polystyrene resins, thermoplastic polyamide resins, polyester resins, polyacetal resins (polyoxymethylene resins), polycarbonate resins, (meth)acrylic resins, polyarylate resins, polyphenylene ether resins, polyimide resins, polyether nitrile resins, phenoxy resins, polyphenylene sulfide resins, polysulfone resins, polyketone resins, polyether ketone resins, thermoplastic urethane resins, fluorine-based resins, thermoplastic polybenzimidazole resins, and the like.

Examples of the polyolefin resin can include one or more selected from the group consisting of polyethylene resin, polypropylene resin, polybutadiene resin, polymethylpentene resin, vinyl chloride resin, vinylidene chloride resin, vinyl acetate resin, polyvinyl alcohol resin, and the like.

Examples of the polystyrene resin can include one or more selected from the group consisting of polystyrene resin, acrylonitrile-styrene resin (AS resin), acrylonitrile-butadiene-styrene resin (ABS resin), and the like.

Examples of the polyamide resin can include one or more selected from the group consisting of polyamide 6 resin (nylon 6), polyamide 11 resin (nylon 11), polyamide 12 resin (nylon 12), polyamide 46 resin (nylon 46), polyamide 66 resin (nylon 66), polyamide 610 resin (nylon 610), and the like.

Examples of the polyester resin can include polyethylene terephthalate resin, polyethylene naphthalate resin, polybutylene terephthalate resin, polytrimethylene terephthalate resin, and liquid crystal polyester.

Examples of the (meth)acrylic resin can include polymethyl methacrylate.

Examples of the modified polyphenylene ether resin can include modified polyphenylene ether.

Examples of the thermoplastic polyimide resin can include thermoplastic polyimide, polyamideimide resin, and polyetherimide resin.

Examples of the polysulfone resin can include one or more selected from the group consisting of modified polysulfone resin, polyethersulfone resin, and the like.

Examples of the polyether ketone resin can include one or more selected from the group consisting of polyether ketone resin, polyether ether ketone resin, and polyether ketone ketone resin.

Examples of the fluorine-based resin can include polytetrafluoroethylene.

The thermoplastic resin used in the present invention may be of only one type, or may be of two or more types. As a mode in which two or more types of thermoplastic resins are used in combination, for example, a mode in which thermoplastic resins having mutually different softening temperatures are used in combination or a mode in which thermoplastic resins having mutually different average molecular weights are used in combination. However, the present invention is not limited thereto.

(Production Method for Fiber-Reinforced Resin Material)

The fiber-reinforced resin material used in the present invention can be produced by a method known in the related art.

In a case where the thermoplastic resin is used as a matrix resin, for example, production can be performed according to, but not limited thereto, the following steps: 1. Step of cutting reinforcing fibers, 2. step of opening the cut reinforcing fibers, and 3. step of mixing the opened reinforcing fibers and a fibrous or particulate matrix resin to become an isotropic base material, and then heating and compressing the isotropic base material so that impregnation of the thermoplastic resin proceeds, to obtain a fiber-reinforced resin material.

An isotropic base material (also referred to as a two-dimensional random orientated mat) and the production method therefor are described in detail in the specifications of Pamphlet of International Publication No. WO2012/105080 and JP-A-2013-49298.

That is, it is possible to obtain a mat by, as necessary, continuously slitting a strand made of a plurality of reinforcing fibers along a length direction of the reinforcing fibers into a plurality of narrow strands of 0.05 mm to 5 mm, then continuously cutting them into an average fiber length of 3 mm to 100 mm, and, in a state of being opened to reinforcing fibers of a smaller single fiber number by spraying gas to the cut reinforcing fibers, performing deposition in a layered manner on a breathable conveyor net or the like. At this time, it is also possible to make production by a method for producing an isotropic base material containing a thermoplastic resin, including depositing a granular or short fibrous thermoplastic resin together with reinforcing fibers on a breathable conveyor net, or supplying a melted thermoplastic resin in the form of a film to a mat-shape reinforcing fiber layer so that the melted thermoplastic resin is permeated thereinto.

In order to control the number of single fibers in the reinforcing fibers (A), in the above-described method for producing a suitable isotropic base material, the control can be achieved by adjusting a size of the reinforcing fibers to be subjected to the cutting step, for example, a width of the reinforcing fibers as a bundle of single fibers and the number of single fibers per width. Specific examples thereof include widening a width of the reinforcing fibers by widening or the like and subjecting it to the cutting step, and a method of providing a slitting step before the cutting step. Alternatively, the reinforcing fibers may be slit simultaneously with cutting.

For the fiber-reinforced resin material using the isotropic base material as described above, in an in-plane thereof, the reinforcing fibers are not oriented in a specific direction, but are dispersely disposed in a random direction. That is, such fiber-reinforced resin material is an in-plane isotropic material. An in-plane isotropy of the fiber-reinforced resin material can be quantitatively evaluated by determining a ratio of the tensile moduli in two directions orthogonal to each other.

EXAMPLES

The following examples are illustrated, but the present invention is not limited thereto. The respective values in the present examples were obtained according to the following methods.

1) Appearances of a flange portion (abbreviated as an end portion in the present examples) and a raised surface of a fiber-reinforced resin shaped product were visually observed and evaluated from the following criteria.

A (extremely good): A mold surface is sufficiently transferred, and there is no difference in gloss on a surface and the surface is uniform and smooth.

B (good): The mold surface is transferred, but the gloss is slightly lower than that of A, and a region of different appearance having a slight difference in gloss or difference in a state of carbon fibers on a surface thereof can be identified.

C (slightly good): The transfer of the mold surface is partially insufficient, and a mottled appearance is exhibited. Thus, it is possible to clearly recognize a site where surface gloss is lost and a site with gloss.

D (defective): A product thickness partially decreases, and the mold surface is not transferred at all, and a surface state of a site where gloss is lost is rough.

2) A full-shot stability is a standard as to whether a good-quality shaped product can be obtained even in a case where a press molding is continuously performed, that is, whether a shaped product can be stably produced. As an evaluation of the full-shot stability, for continuously performed 20-shot molding, it was determined to be "good" in a case where 20 full-shot shaped products were obtained, and it was determined as "poor" in a case where an unfilled shaped product was included.

3) With respect to a surface transfer property, a semispherical concave portion with a radius of 300 μm was provided on a surface location of molds corresponding to a flange portion at an end portion of a target shaped product, a height of the hemisphere of the obtained shaped product was measured, and evaluation was performed according to how the height was close to 300 μm.

4) With respect to a proportion occupied by reinforcing fibers (A), that are composed of single fibers of which the number is equal to and greater than a critical single fiber number, in the reinforcing fibers contained in the molding material or the fiber-reinforced resin shaped product, measurement and calculation were performed in accordance with the method described in Pamphlet of International Publication No. WO2012/105080 or US-A-2014/0178631.

Figure 2:
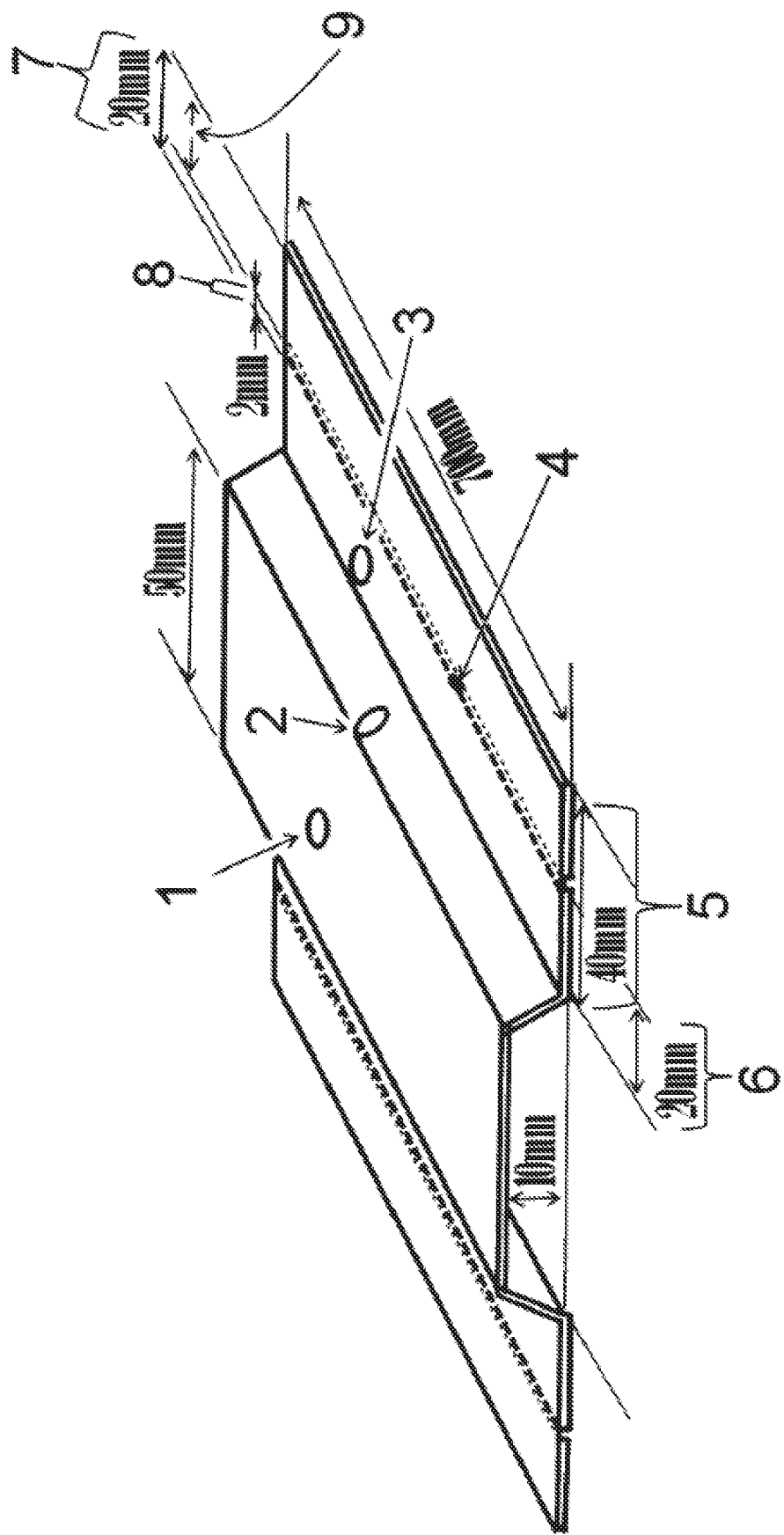
FIG. 2 is a schematic view of an example of a fiber-reinforced resin shaped product having an edge portion of the present invention (hat-shaped product having a height of 10 mm).

5) The schematic views of the shaped product in FIGS. 1 and 2 show positions where an internal pressure of the cavity was measured by a pressure sensor. More precisely, the pressure sensor was installed at a position on a cavity surface of the molds corresponding to the position, and the internal pressure of the cavity was measured. Since this pressure sensor measures a pressure applied to the cavity surface of the molds, it becomes difficult to accurately measure a pressure applied to the molding material as the molding material in the cavity is cooled and solidified. Therefore, in the examples of the present invention, pressure was measured for 3 seconds from initiation of pressurization, and the highest pressure during the time was recorded and used as a pressure value.

6) A thickness value of the obtained shaped product is a value obtained by measuring the thickness in micrometer at the position shown in each of the schematic views of FIGS. 1 and 2.

(Shapes of Molds and Shaped Product)

As shown in FIGS. 1 and 2, molds composed of an upper mold and a lower mold were used to perform press molding, in which cavities corresponding to shaped products with a hat-shaped cross section are formed, and the hat-shaped cross sections have heights of 30 mm and 10 mm, respectively, and the same thickness of 2.5 mm. In the molds, a width of a part (a flange equivalent portion) corresponding to the flange portion of the shaped product is 40 mm, in which a part thereof with a width of 20 mm is a region with a thickness of 2.5 mm which is interpreted as some of the substantially central portion of the cavity, and the remaining width of 20 mm is a region containing the pinching portion at the cavity. In the molds, a site forming the pinching portion is composed of a block formed of a nest structure, and it is possible to adjust a thickness and a width at the pinching portion by replacing the block.

To make a definition in detail regarding a width in a shape of the shaped product and the cavity of the molds, in a case where a longitudinal direction of a shaped product obtained by molding using the molds is set as a Y-axis direction in an XYZ coordinate system and a height thereof is set as a Z-axis direction, the dimension of the shaped product in an X-axis direction is a width thereof.

In some examples and the like, molds having a cavity shape corresponding to a 400 mm×400 mm flat-plate shaped product was used (hereinafter referred to as flat-plate shape molds in some cases).

7) Tensile elongation at break $\varepsilon_v$ (%) of molding material (fiber-reinforced resin material)

The molding material is heated to a temperature equal to or higher than a softening temperature of the thermoplastic resin as a matrix, and the molding material is disposed on molds for press molding for measuring tensile elongation at break $\varepsilon_v$, the molds are closed at a mold clamping speed of 20 mm/sec until the molding material is broken, the molding material is taken out, a length of the molding material elongated is measured, and the length of the molding material is divided by a length thereof before elongation, that is, by Expression (e), to perform calculation.

$$\varepsilon_v(\%) = 100 \times \text{length after elongation of molding material/length before elongation of molding material} \quad (e)$$

(Molding Machine)

In the present application, a hydraulic 5000 kN press machine manufactured by Kawasaki Oil Co., Ltd. was used. Unless otherwise specified, a molding condition was the same. Specifically, the molds as described later were mounted, and the molds were clamped at a pressing pressure of 15 MPa, a mold temperature of 150° C., and a molding material heating temperature of 290° C., that is, press molding was performed.

(Molding Material)

[Production Example 1] Production of Molding Material

Using, as reinforcing fibers, PAN-based carbon fibers "Tenax" (registered trademark) STS40-24KS (average diameter of single fibers of 7 μm, single fiber number of 24,000) manufactured by TOHO TENAX Co., Ltd., which was treated with a nylon sizing agent, and as a matrix resin, nylon 6 resin A1030 (melting point of 225° C.) manufactured by Unitika Ltd., based on the method described in Pamphlet of International Publication No. WO2012/105080, an in-plane isotropic base material was prepared, in which the carbon fibers having a weight average fiber length of 20 mm are two-dimensionally randomly oriented and which has carbon fiber areal weight of 1,800 g/m². The obtained in-plane isotropic base material was introduced into flat-plate shape molds set at 250° C., pressurized at 2 MPa for 10 minutes, and then a temperature of the molds was lowered to 100° C. to obtain a flat-plate shape, in-plane isotropic molding material having a thickness of 2.6 mm, in which a nylon 6 resin was sufficiently impregnated in a mat structure in which carbon fibers were two-dimensionally randomly oriented. A volume fraction (Vf) of reinforcing fibers of this molding material was 35%; a weight average fiber length of the reinforcing fibers contained therein is 20 mm; a critical single fiber number thereof is 86; and a proportion of the amount of reinforcing fibers (A), that are composed of carbon single fibers of which the number is equal to and greater than a critical single fiber number, in a total amount of the reinforcing fibers was 77 vol %. In the molding material, as reinforcing fibers other than the reinforcing fibers (A), there were also bundles composed of carbon single fibers of which the number is less than the critical single fiber number, and carbon fibers in the form of single fibers. In this molding material, a tensile elongation at break F, obtained from Expression (e) is in a range of 105% to 400%.

Example 1

Using a molding material obtained in Production Example 1 and having a thickness of 2.6 mm, which was cut into a rectangular type of 700 mm×190 mm, press molding (20-shot continuous molding) was performed in the following procedure.

Molds having a cavity with a shape corresponding to a hat-shaped product (FIG. 1) having a height of 30 mm were used. A block of a pinching portion of the molds was set so that a thickness of gap (at the pinching portion) was 1.5 mm and a width of the pinching portion was 10 mm from an edge of a substantially central portion of the cavity.

The molding material which was heated and was in a plastic state was placed on a lower mold of the molds so that both end portions of the molding material in a width direction were pinched by the pinching portion at the cavity of the molds. Then, clamping of the molds was initiated. First, a periphery of the central portion (substantially central portion) of the molding material is drawn into a space around a convex portion of the lower mold by a concave portion of the upper mold, then both end portions of the molding material were pressed by the pinching portion at the cavity by mold clamping and fixed while being squashed. As the mold clamping progressed further, both end portions of the molding material are fixed by the pinching portions without being dislocated, and the molding material was hat-shaped like the cavity shape. After the mold clamping was completed and it was determined that the molding material had been sufficiently cooled and solidified, the molds were opened, and a hat-shaped fiber-reinforced resin shaped product (hereinafter abbreviated as a hat-shaped product) having an edge portion was obtained, in which the end portions of the molding material during the mold clamping, that is, a part pinched by the pinching portion at the cavity (10 mm in width) during press molding, and outer parts thereof were the edge portions. The edge portions of the hat-shaped product were sites, each having a width of 20 mm from both edges thereof in a width direction.

Supplementary information on the molds and the molding condition during the press molding was as follows: A cavity projected area of the molds was 945 cm$^2$, an area of the pinching portion was 140 cm$^2$, a maximum pressure applied to the pinching portions in the mold clamping was 38 MPa, and a maximum pressure applied to the cavity portion was 20 MPa. A force of the mold clamping was set to 1,890 kN and a pressure was set to be 20 MPa per cavity projected area.

A pinching constant Kp (MPa·cm$^2$/kN) defined by Expression (p) from a maximum pressure (MPa) applied to the pinching portions, a pinching area (cm$^2$), and a mold clamping force (kN) was 0.28. Edge portion included in the hat-shaped product obtained as described above were cut by an end mill to obtain a fiber-reinforced resin processed product.

Observation and measurement of the fiber-reinforced resin processed product obtained showed that an appearance of the end portions thereof was good without any trace of flowing or transfer defects. In addition, a height of a hemispherical protrusion of 300 μm in design radius, which was installed in a product flange portion, was 280 μm, and a surface transfer property was also good. With respect to a thickness of a top surface of 2.4 mm in the hat-shaped product, a thickness of a raised surface was also 2.4 mm, which was a uniform thickness like the cavity, and the raised surface also had no trace of wrinkles. Thus, the entire hat-shaped product was good in appearance. It is clear that the above observation and measurement results are applicable even to the hat-shaped product before the edge portions are cut.

The evaluation results for the molding of the present example are shown in Table 1.

Example 2

The same operation as in Example 1 was performed except that the block of the molds was changed, and the thickness, width, and area of the pinching portion were set to 1.3 mm, 5 mm, and 70 cm$^2$, respectively. It was possible to continuously obtain a hat-shaped product having a good appearance as in Example 1. The maximum pressure of the pinching portions was 56 MPa: the maximum pressure of the cavity was 20 MPa; and the pinching constant Kp (MPa·cm$^2$/kN) was 0.20.

The evaluation results for the molding of the present example are shown in Table 1.

Example 3

The same operation as in Example 1 was performed except that the block of the molds was changed, and the thickness, width, and area of the pinching portion were set to 1.0 mm, 3 mm, and 42 cm$^2$, respectively. It was possible to continuously obtain a hat-shaped product having a good appearance as in Example 1. The maximum pressure of the pinching portions was 73 MPa; the maximum pressure of the cavity was 20 MPa; and the pinching constant Kp (MPa·cm$^2$/kN) was 0.16.

The evaluation results for the molding of the present example are shown in Table 1.

Example 4

The same operation as in Example 1 was performed except that as the molds, molds having a cavity for a hat-shaped product with a height of 10 mm as shown in FIG. 2, not in FIG. 1, was used; the block of the pinching portion of the molds was set so that a thickness at the pinching portions was 1.3 mm and a width of the pinching portion was 2 mm; and the molding material was cut into a rectangular type of 700 mm×150 mm and used. It was possible to continuously obtain a hat-shaped product having a good appearance as in Example 1. The cavity projected area was 945 cm$^2$, the area of the pinching portion was 28 cm$^2$, the maximum pressure applied to the pinching portions was 49 MPa, and the maximum pressure of the cavity portion was 20 MPa. A force of the mold clamping was set to 1,890 kN and a pressure was set to be 20 MPa per cavity projected area. The pinching constant Kp (MPa·cm$^{2'}$ kN) was 0.08.

The evaluation results for the molding of the present example are shown in Table 1.

Example 5

The same operation as in Example 1 was performed except that a molding material, in which a proportion of the amount of reinforcing fibers (A) in a total amount of the reinforcing fibers was 87 vol %, was used. It was possible to continuously obtain a hat-shaped product having a good appearance as in Example 1. The maximum pressure of the pinching portions was 32 MPa, and the pinching constant Kp (MPa·cm$^2$/kN) was 0.23.

The evaluation results for the molding of the present example are shown in Table 1.

Example 6

The same operation as in Example 1 was performed except that a molding material, in which a proportion of the amount of reinforcing fibers (A) in a total amount of the reinforcing fibers was 65 vol %, was used. It was possible to continuously obtain a hat-shaped product having a good appearance as in Example 1. The maximum pressure of the pinching portions was 38 MPa, and the pinching constant Kp (MPa·cm²/kN) was 0.28.

The evaluation results for the molding of the present example are shown in Table 2.

Example 7

The same operation as in Example 1 was performed except that, molds were used which had a cavity shape corresponding to a flat-plate shaped product of 400 mm×400 mm×2.5 mm, not one shown in FIG. 1, and in which a region having a width of 20 mm on the entire outer periphery of the cavity was a substantially outer peripheral end portion, a product shape portion (substantially central portion) was 360 mm square, and a block was used to adjust the pinching portions so that a thickness at the pinching portions was 1.5 mm and a width of the pinching portion was 5 mm. Also in the present example, it was possible to continuously obtain a shaped product which is good in appearance and has an edge portion. In the press molding, the cavity projected area was 1,600 cm²: the area of the pinching portion was 77 cm²; the maximum pressure of the pinching portions was 38 MPa: the maximum pressure of the cavity was 20 MPa; and the pinching constant Kp (MPa·cm²/kN) was 0.09.

The evaluation results for the molding of the present example are shown in Table 2.

Example 8

The same operation as in Example 1 was performed except that a molding material, in which a proportion of the amount of reinforcing fibers (A) in a total amount of the reinforcing fibers was 95 vol %, was used. It was possible to continuously obtain a hat-shaped product having a good appearance as in Example 1. However, the amount of the molding material flowing out of the pinching portions slightly increased during the press molding; and even for the obtained hat-shaped product having an edge portion, a thickness of a top surface thereof decreased, thereby resulting in a thickness difference between the top surface and a raised surface. Furthermore, the surface transfer property of a flange portion decreased. The maximum pressure of the pinching portions was 33 MPa, and the pinching constant Kp (MPa·cm²/kN) was 0.24.

The evaluation results for the molding of the present example are shown in Table 2.

Example 9

The same operation as in Example 1 was performed except that a molding material, in which a proportion of the amount of reinforcing fibers (A) in a total amount of the reinforcing fibers was 55 vol %, was used. It was possible to continuously obtain a hat-shaped product having a good appearance as in Example 1. However, for the obtained hat-shaped product having an edge portion, a thickness of a top surface thereof increased, and a thickness of a raised surface portion decreased and appearance of the raised surface portion slightly deteriorated. Furthermore, the surface transfer property of a flange portion considerably decreased. The maximum pressure of the pinching portions was 41 MPa, and the pinching constant Kp (MPa·cm²/kN) was 0.31.

The evaluation results for the molding of the present example are shown in Table 2.

Example 10

The same operation as in Example 1 was performed except that the block of the molds was changed, and the thickness, width, and area of the pinching portion were set to 0.5 mm, 5 mm, and 70 cm², respectively. It was possible to continuously obtain a hat-shaped product having a slightly good appearance. The maximum pressure of the pinching portions was 110 MPa: the maximum pressure of the cavity was 12 MPa; and the pinching constant Kp (MPa·cm²/kN) was 0.41.

The evaluation results for the molding of the present example are shown in Table 2.

Comparative Example 1

The same operation as in Example 1 was performed except that the press molding was performed by a technique of installing needle-shaped protrusions at a 100 mm pitch on the block of the pinching portion of the lower mold, puncturing and fixing the molding material, which was heated and brought into a plastic state, with needles, and then initiating mold clamping. In the obtained hat-shaped product having an edge portion, a thickness of the top surface portion was extremely thin and a trace of wrinkles in the raised surface portion also did not disappear, and thus poor appearance was exhibited. The transfer property of the flange portion thereof also extremely decreased, which made it difficult to say that the product had a good quality. This is presumably because, in the press molding, the fixing of the molding material was performed before the initiation of the mold clamping, drawing of the molding material due to the mold clamping did not occur, and the molding material was significantly pulled out by the mold clamping.

The evaluation results for the molding of the present comparative example are shown in Table 3.

Comparative Example 2

The same operation as in Example 1 was performed except that molds, in which a block of a site forming the pinching portion of the lower mold had a flat shape, and a pressing block, which was a working nest and stroked 40 mm by mold clamping, was installed at a site forming the pinching portion of the upper mold, were used; and in the press molding, the molding material was fixed at a position 40 mm higher before the molding material was caught between the upper mold and the lower mold by the mold clamping. In the obtained hat-shaped product having an edge portion, a thickness of the top surface portion was extremely thin and a trace of wrinkles in the raised surface portion also did not disappear, and thus poor appearance was exhibited. The transfer property of the flange portion thereof also extremely deteriorated, which made it difficult to say that the product had a good quality. This is presumably because, in the press molding, the fixing of the molding material was performed before the initiation of the mold clamping, drawing of the molding material due to the mold clamping did not occur, and the molding material was significantly pulled out by the mold clamping.

The evaluation results for the molding of the present comparative example are shown in Table 3.

Comparative Example 3

The same operation as in Example 1 was performed except that the molding material was cut into a rectangular type of 700 mm×140 mm. In a continuous press molding, a short shot was generated, which made it difficult to say that the shaped product could be stably produced. The obtained hat-shaped product with an edge portion had a poor appearance due to generation of a trace of flowing at the end portions thereof. This is presumably because, in the press molding, the molding material was pressed by the upper mold almost simultaneously with the initiation of mold clamping and was drawn into the concave portion of the lower mold, so that the end portion of the molding material was not fixed by the pinching portions.

The evaluation results for the molding of the present comparative example are shown in Table 3.

Comparative Example 4

The same operation as in Example 1 was performed except that with respect to the cavity of the molds, a thickness at the pinching portions was set as 2.5 mm, which was the same as a thickness at the actual cavity (thickness at the substantially central portion of the cavity), and both end portions of the molding material were not fixed by the pinching portions even after the molding material began to be drawn into the space around the convex portion of the lower mold. In a continuous press molding, drawing of the molding material into the molds at the initiation of mold clamping became unstable and a short shot was generated, which made it difficult to say that the shaped product could be stably produced. The obtained hat-shaped product with an edge portion had an extremely deteriorated transfer property in the flange portion thereof.

The evaluation results for the molding of the present comparative example are shown in Table 3.

TABLE 1

|  | Example 1 | Example 2 | Example 3 | Example 4 | Example 5 |
| --- | --- | --- | --- | --- | --- |
| End portion appearance of shaped product | A | A | A | A | A |
| Full-shot stability | Good | Good | Good | Good | Good |
| Surface transfer property[μm] | 280 | 280 | 280 | 290 | 280 |
| Raised surface appearance of shaped product | A | A | A | A | A |
| Thickness of top surface[mm] | 2.4 | 2.4 | 2.4 | 2.4 | 2.4 |
| Thickness of raised surface[mm] | 2.4 | 2.4 | 2.4 | 2.4 | 2.4 |

TABLE 2

|  | Example 6 | Example 7 | Example 8 | Example 9 | Example 10 |
| --- | --- | --- | --- | --- | --- |
| End portion appearance of shaped product | A | A | A | A | A |
| Full-shot stability | Good | Good | Good | Good | Good |
| Surface transfer property[μm] | 280 | 280 | 140 | 62 | 110 |
| Raised surface appearance of shaped product | A | A | A | B | C |
| Thickness of top surface[mm] | 2.5 | 2.4 | 2.2 | 3.2 | 2.8 |
| Thickness of raised surface[mm] | 2.2 | — | 2.4 | 2.0 | 2.3 |

TABLE 3

|  | Comparative Example 1 | Comparative Example 2 | Comparative Example 3 | Comparative Example 4 |
| --- | --- | --- | --- | --- |
| End portion appearance of shaped product | A | A | D | A |
| Full-shot stability | Good | Good | Poor | Poor |
| Surface transfer property[μm] | 26 | 39 | 240 | 90 |
| Raised surface appearance of shaped product | D | D | A | C |
| Thickness of top surface[mm] | 1.5 | 1.5 | 1.9 | 2.2 |
| Thickness of raised surface[mm] | 2.3 | 2.3 | 2.3 | 2.3 |

INDUSTRIAL APPLICABILITY

The production method of the present invention makes it possible to produce a fiber-reinforced resin shaped product having an excellent appearance, with high productivity, and it is suitable for applications which require excellent physical properties and high cost competitiveness such as structural parts of automobiles and the like.

While the present invention has been described in detail and with reference to specific embodiments, it will be apparent to those skilled in the art that various changes and modifications can be made without departing from the spirit and scope of the present invention.

This application is based on Japanese Patent Application (Japanese Patent Application No. 2016-003024) filed on Jan. 8, 2016, the entire contents of which are incorporated herein by reference.

REFERENCE SIGNS LIST

1: Measurement location of thickness of top surface of hat-shaped product
2: Measurement location of thickness of raised surface of hat-shaped product
3: Location at which pressure at cavity portion of molds is measured during press molding
4: Location at which pressure at pinching portions of molds is measured during press molding
5: Flange portion (width thereof)
6: Product flange portion (width thereof)
7: Edge portion (width thereof)
8: Site (width thereof), which corresponds region where molding material has been pressed by pinching portions during press molding, in edge portion of hat-shaped product
9: Site (width thereof), which corresponds region outside region where molding material has been pressed by pinching portions during press molding, in edge portion of hat-shaped product
10: Upper mold
11: Lower mold
12: Molding material
13: Pinching portions
14: Substantially central portion (product shape portion)
15: Hat-shaped product (shaped product with an edge portion)

The invention claimed is:

1. A method for producing a fiber-reinforced resin shaped product, by mold clamping and press-molding a molding material containing reinforcing fibers and a thermoplastic resin as a matrix in molds having an upper mold and a lower mold, the method comprising:

disposing the molding material, which is heated and is in a plastic state, between the upper mold and the lower mold;

initiating the mold clamping to apply a force in a substantially mold clamping direction to a certain site of the molding material;

starting deformation of the molding material in the substantially mold clamping direction;

applying a force in the substantially mold clamping direction to a fixing site which is present in at least a part of a substantially outer peripheral end portion of the molding material but is different from the certain site;

pressing and fixing the fixing site; and completing the mold clamping to obtain a fiber-reinforced resin shaped product having an edge portion, wherein the molds have a cavity formed by the upper mold and the lower mold during the mold clamping, and have a pinching portion at which the cavity has a smaller thickness than a substantially central portion of the cavity, the pinching portion being formed at a substantially outer peripheral end portion of the cavity, and the molding material is disposed in the molds so that at least a part of the substantially outer peripheral end portion of the molding material in a plastic state is pinched by the pinching portion at the cavity during the mold clamping, thereby applying a force in the substantially mold clamping direction to the fixing site at the substantially outer peripheral end portion of the molding material, wherein in the mold clamping, a pinching constant Kp (MPa·cm²/kN) defined by Expression (p) is less than 0.5:

$$\{(\text{Pinching portion maximum pressure (MPa)}) \times (\text{pinching portion area (cm}^2))/10\}/(\text{mold clamping force (kN)}) = \text{pinching constant } K_p \text{ (MPa·cm}^2\text{/kN)} \tag{p}$$

2. The method for producing a fiber-reinforced resin shaped product according to claim 1, wherein the cavity has a planar-shape portion and a non-planar-shape portion in a cavity cross-sectional shape viewed in a substantially vertical direction with respect to the substantially mold clamping direction, and a distance between a position at a surface of the planar-shape portion and a position at a surface of the non-planar-shape portion which continues to the surface of the planar-shape portion in the substantially mold clamping direction is larger than a thickness of the substantially central portion of the cavity.

3. The method for producing a fiber-reinforced resin shaped product according to claim 1, wherein a proportion of the amount of reinforcing fibers (A) that are bundles of single fibers, each having the number equal to or larger than a critical single fiber number defined by Expression (1), in a total amount of the reinforcing fibers, is 60 vol % to 90 vol %, $$\text{Critical single fiber number} = 600/D \tag{1}$$

(in the expression, D is an average diameter (m) of single fibers of the reinforcing fibers).

4. The method for producing a fiber-reinforced resin shaped product according to claim 1, wherein a weight average fiber length of the reinforcing fibers is 0.1 mm to 500 mm.

5. The method for producing a fiber-reinforced resin shaped product according to claim 1, wherein the reinforcing fibers are two-dimensionally randomly oriented in both the molding material and the fiber-reinforced resin shaped product.

6. The method for producing a fiber-reinforced resin shaped product according to claim 1, wherein in at least one of the molding material and the fiber-reinforced resin shaped product, a volume fraction Vf of reinforcing fibers with respect to the reinforcing fibers and the thermoplastic resin, defined by Expression (u) is 5% to 80%

$$(\text{Volume fraction of reinforcing fibers } Vf) = 100 \times (\text{volume of reinforcing fibers})/((\text{volume of reinforcing fibers}) + (\text{volume of thermoplastic resin})) \tag{u}$$

7. The method for producing a fiber-reinforced resin shaped product according to claim 1, wherein a tensile elongation at break $\varepsilon_v$ defined by Expression (e) of the molding material is 105% to 400%, $$\varepsilon_v(\%)=100\times(\text{length after elongation of molding material})/(\text{length before elongation of molding material}) \quad (e)$$

in the expression, the length of the molding material after elongation is a length of the molding material elongated at a tensile speed of 20 mm/sec and at a temperature equal to or higher than a softening temperature of the thermoplastic resin as the matrix of the molding material and is expressed in the same unit as the length of the molding material before elongation.

8. A method for producing a fiber-reinforced resin processed product, comprising:

cutting the edge portion included in the fiber-reinforced resin shaped product obtained by the production method according to claim 1.

\* \* \* \* \*